United States Patent
Rao et al.

(10) Patent No.: US 10,720,949 B1
(45) Date of Patent: Jul. 21, 2020

(54) REAL-TIME TIME-DIFFERENCE-OF-ARRIVAL (TDOA) ESTIMATION VIA MULTI-INPUT COGNITIVE SIGNAL PROCESSOR

(71) Applicant: HRL Laboratories, LLC, Malibu, CA (US)

(72) Inventors: Shankar R. Rao, Norwalk, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/295,917

(22) Filed: Mar. 7, 2019

Related U.S. Application Data

(63) Continuation-in-part of application No. 15/910,821, filed on Mar. 2, 2018, and a continuation-in-part of application No. 15/910,922, filed on Mar. 2, 2018, now Pat. No. 10,404,299, which is a continuation-in-part of application No. 15/452,412, filed on Mar. 7, 2017, now Pat. No. 10,153,806, said application No. 15/910,922 is a continuation-in-part of application No. 15/631,307, filed on Jun. 23, 2017, now Pat. No. 10,162,378, which is a continuation-in-part of application No. 15/073,626, (Continued)

(51) Int. Cl.
  *H04B 1/12* (2006.01)
  *G06N 3/08* (2006.01)
  *G06N 3/04* (2006.01)

(52) U.S. Cl.
  CPC .......... *H04B 1/126* (2013.01); *G06N 3/0445* (2013.01); *G06N 3/08* (2013.01)

(58) Field of Classification Search
  CPC ......... H04B 1/126; G06N 3/08; G06N 3/0445
  USPC ...................................................... 375/130
  See application file for complete search history.

(56) References Cited

U.S. PATENT DOCUMENTS 5,694,474 A   12/1997  Ngo
6,691,073 B1   2/2004  Erten
(Continued)

OTHER PUBLICATIONS

A. Emadzadeh, C. Lopes, and J. Speyer, "Online Time Delay Estimation of Pulsar Signals for Relative Navigation using Adaptive Filters", in Proc. of IEEE Position, Location, and Navigation (PLN) Symposium, pp. 714-719, 2008.
(Continued)

*Primary Examiner* — Fitwi Y Hailegiorgis
(74) *Attorney, Agent, or Firm* — Tope-McKay & Associates

(57) ABSTRACT

Described is a multi-input cognitive signal processor (CSP) for estimating time-difference-of-arrival (TDOA) of incoming signals. The multi-input CSP receives a mixture of input signals from an antenna a and an antenna b. The multi-input CSP predicts and temporally de-noises input signals a and b received from antennas a and b, respectively, using an input corresponding to each input signal, resulting in de-noised state vectors for input signals a and b. Using the de-noised state vectors for input signals a and b, cross-predicting and spatially de-noising the other of the de-noised state vectors for input signals a and b. TDOA values of signal pulses to each of antennas a and b are estimated and converted into estimated angles of arrival for each signal pulse.

23 Claims, 19 Drawing Sheets

Related U.S. Application Data filed on Mar. 17, 2016, now Pat. No. 9,749,007, and a continuation-in-part of application No. 15/452,155, filed on Mar. 7, 2017, now Pat. No. 10,484,043, which is a continuation-in-part of application No. 15/073,626, said application No. 15/631,307 is a continuation-in-part of application No. 15/452,412, which is a continuation-in-part of application No. 15/073,626, said application No. 15/910,922 is a continuation-in-part of application No. 15/452,155, and a continuation-in-part of application No. 15/817,906, filed on Nov. 20, 2017, now Pat. No. 10,128,820, which is a continuation-in-part of application No. 15/452,412, which is a continuation-in-part of application No. 15/073,626, said application No. 15/817,906 is a continuation-in-part of application No. 15/452,155, application No. 16/295,917, which is a continuation-in-part of application No. 16/108,041, filed on Aug. 21, 2018, now Pat. No. 10,380,062, which is a continuation-in-part of application No. 15/452,412, and a continuation-in-part of application No. 15/073,626, said application No. 16/108,041 is a continuation-in-part of application No. 15/910,821, and a continuation-in-part of application No. 15/910,922, which is a continuation-in-part of application No. 15/452,412, said application No. 15/910,922 is a continuation-in-part of application No. 15/631,307, and a continuation-in-part of application No. 15/452,155, and a continuation-in-part of application No. 15/817,906, said application No. 16/108,041 is a continuation-in-part of application No. 15/817,906, which is a continuation-in-part of application No. 15/452,412, which is a continuation-in-part of application No. 15/073,626, said application No. 15/817,906 is a continuation-in-part of application No. 15/452,155, application No. 16/295,917, which is a continuation-in-part of application No. 16/112,071, filed on Aug. 24, 2018, which is a continuation-in-part of application No. 15/452,412, which is a continuation-in-part of application No. 15/073,626, said application No. 16/112,071 is a continuation-in-part of application No. 15/631,307, which is a continuation-in-part of application No. 15/073,626, said application No. 15/631,307 is a continuation-in-part of application No. 15/452,155, which is a continuation-in-part of application No. 15/073,626, said application No. 15/631,307 is a continuation-in-part of application No. 15/452,412, which is a continuation-in-part of application No. 15/073,626, said application No. 16/112,071 is a continuation-in-part of application No. 15/910,821, and a continuation-in-part of application No. 15/910,922, which is a continuation-in-part of application No. 15/452,412, and a continuation-in-part of application No. 15/631,307, and a continuation-in-part of application No. 15/452,155, and a continuation-in-part of application No. 15/817,906.

(60) Provisional application No. 62/500,889, filed on May 3, 2017, provisional application No. 62/500,966, filed on May 3, 2017, provisional application No. 62/304,623, filed on Mar. 7, 2016, provisional application No. 62/379,634, filed on Aug. 25, 2016, provisional application No. 62/135,539, filed on Mar. 19, 2015, provisional application No. 62/447,883, filed on Jan. 18, 2017, provisional application No. 62/574,001, filed on Oct. 18, 2017, provisional application No. 62/576,905, filed on Mar. 19, 2015, provisional application No. 62/642,455, filed on Mar. 13, 2018.

(56) References Cited

U.S. PATENT DOCUMENTS

| | | | |
|---|---|---|---|
| 7,474,756 B2 | 1/2009 | Ricard et al. | |
| 8,031,117 B2 | 10/2011 | Goldberg | |
| 9,042,496 B1 | 5/2015 | Su | |
| 2004/0054479 A1 | 3/2004 | Trickett | |
| 2005/0047611 A1 | 3/2005 | Mao | |
| 2005/0267377 A1 | 12/2005 | Marossero | |
| 2010/0158271 A1 | 6/2010 | Park et al. | |
| 2012/0207195 A1 | 8/2012 | Kawasaki | |
| 2012/0232418 A1* | 9/2012 | Kimura | A61B 5/02411 600/528 |
| 2013/0304395 A1 | 11/2013 | Naidu | |
| 2014/0114650 A1 | 4/2014 | Hershey | |
| 2014/0327566 A1 | 11/2014 | Burgio | |
| 2015/0009072 A1* | 1/2015 | Nijsure | G01S 5/0215 342/417 |
| 2016/0203827 A1 | 7/2016 | Leff | |

OTHER PUBLICATIONS

E. Fishler and H. V. Poort, "Estimation of the number of sources in unbalanced arrays via information theoretic criteria," IEEE Trans. on Signal Processing, vol. 53, No. 9, pp. 3543-3553, 2005.

C. Knapp and G. Carter, "The Generalized Correlation Method for Estimation of Time Delay," IEEE Transactions of Accoustics, Speech, and Signal Processing, vol. 24, No. 4, pp. 320-327, 1976.

W. Maass, "Liquid Computing", In Proc. of the Conference CiE'07: Computability in Europe 2007, Siena (Italy), pp. 507-516, 2007.

S. Mann and S. Haykin, "The Chirplet transform: A generalization of Gabor's logon transform", In Proc. Vision Interface 1991, pp. 205-212, (Jun. 3-7, 1991).

F. Takens, "Detecting Strange Attractors in Turbulence," Dynamical Systems and Turbulence, Lecture Notes in Mathematics vol. 898, pp. 366-381, 1981.

H. Yap, et al., "A First Analysis of the Stability of Takens' Embedding," in Proc. of the IEEE Global Conference on Signal and Information Processing (GlobalSIP) symposium on Information Processing for Big Data, pp. 404-408, Dec. 2014.

S. Choi, A. Cichocki, H.-M. Park, and S.-Y. Lee, "Blind Source Separation and Independent Component Analysis: A Review," Neural Information Processing—Letters, vol. 6, No. 1, Jan. 2005, pp. 1-57.

A. Cichocki and A. Belouchrani, "Sources separation of temporally correlated sources from noisy data using a bank of band-pass filters," in Proc. of Independent Component Analysis and Signal Separation (ICA—2001), pp. 173-178, San Diego, USA, Dec. 9-13, 2001.

A. Hyvarinen, "Complexity Pursuit: Separating Interesting Components from Time Series," Neural Computation, vol. 13, No. 4, pp. 883-898, Apr. 2001.

C. Igel and M. Husken, "Improving the Rprop learning algorithm", in Proc. of the 2nd Int. Symposium on Neural Computation (NC'2000), pp. 115-121, ICSC Academic Press, 2000.

H. Jaeger, et al. "Harnessing nonlinearity: Predicting chaotic systems and saving energy in wireless communications," Science, vol. 304, No. 5667, pp. 78-80, 2004.

R. Legenstein, et al. "Edge of Chaos and Prediction of Computational Performance for Neural Microcircuit Models," Neural Networks, 20(3), 2007, pp. 323-334.

W. Maass, "Liquid Computing", Proc. of the Conference CiE'07: Computability in Europe 2007, Siena (Italy), 2007, pp. 507-516.

F. Takens, "Detecting Strange Attractors in Turbulence," Dynamical Systems and Turbulence, Lecture Notes in Mathematics vol. 898, 1981, pp. 366-381.

(56) References Cited

OTHER PUBLICATIONS

D. Verstraeten, et al. "An experimental unification of reservoir computing methods", Neural Networks, vol. 20, No. 3, Apr. 2007, pp. 391-403.
Walden, "Analog-to-digital converter survey and analysis," IEEE J. Sel. Areas Commun., vol. 51, pp. 539-548, 1999.
H. Yap, et al., "A First Analysis of the Stability of Takens' Embedding," in Proc. of the IEEE Global Conference on Signal and Information Processing (GlobalSIP) symposium on Information Processing for Big Data, Dec. 2014, pp. 404-408.
Office Action 1 for U.S. Appl. No. 15/631,307, dated Oct. 5, 2017.
Response to Office Action 1 for U.S. Appl. No. 15/631,307, dated Jan. 4, 2018.
Office Action 2 for U.S. Appl. No. 15/631,307, dated Apr. 19, 2018.
Response to Office Action 2 for U.S. Appl. No. 15/631,307, dated Jun. 15, 2018.
Notice of Allowance for U.S. Appl. No. 15/631,307, dated Jul. 18, 2018.
Notification of Transmittal of International Search Report and the Written Opinion of the International Searching Authority for PCT/US2017/062561; dated Feb. 6, 2018.
International Search Report of the International Searching Authority for PCT/US2017/062561; dated Feb. 6, 2018.
Written Opinion of the International Searching Authority for PCT/US2017/062561; dated Feb. 6, 2018.
E. Candès and T. Tao, "Near-Optimal Signal Recovery from Random Projections: Universal Encoding Strategies?", IEEE Transactions on Information Theory, vol. 52, No. 12, pp. 5406-5425, 2006.
A. Oppenheim and R. Schafer, "Chapter 7: Filter Design Techniques", in Discrete-Time Signal Processing, Second Edition, pp. 439-540, 1999.
Office Action 1 for U.S. Appl. No. 16/108,041, dated Nov. 29, 2018.
Response to Office Action 1 for U.S. Appl. No. 16/108,041, dated Feb. 27, 2019.
Notice of Allowance for U.S. Appl. No. 16/108,041, dated Mar. 15, 2019.
Office Action 1 for U.S. Appl. No. 15/817,906, dated Feb. 23, 2018.
Response to Office Action 1 for U.S. Appl. No. 15/817,906, dated May 23, 2018.
Notice of Allowance for U.S. Appl. No. 15/817,906, dated Jul. 6, 2018.
S. Mann and S. Haykin, "The Chirplet transform: A generalization of Gabor's logon transform", Proc. Vision Interface 1991, pp. 205-212, 3-7, 1991.
Office Action 1 for U.S. Appl. No. 16/112,071, dated Dec. 14, 2018.
Response to Office Action 1 for U.S. Appl. No. 16/112,071, dated Mar. 13, 2019.
Office Action 2 for U.S. Appl. No. 16/112,071, dated Apr. 4, 2019.
Response to Office Action 2 for U.S. Appl. No. 16/112,071, dated Jun. 26, 2019.
Office Action 3 for U.S. Appl. No. 16/112,071, dated Jul. 10, 2019.
Response to Office Action 3 for U.S. Appl. No. 16/112,071, dated Nov. 4, 2019.
R. Legenstein, et al. "Edge of Chaos and Prediction of Computational Performance for Neural Microcircuit Models," Neural Networks 20 (3), pp. 323-334, 2007.
W. Maass, "Liquid Computing", Proc. of the Conference CiE'07: Computability in Europe 2007, Siena (Italy), pp. 507-516.
R. Walden, "Analog-to-digital converter survey and analysis," IEEE J. Sel. Areas Commun., vol. 51, pp. 539-548, 1999.
Office Action 1 for U.S. Appl. No. 15/452,412, dated May 10, 2017.
Response to Office Action 1 for U.S. Appl. No. 15/452,412, dated Aug. 9, 2017.
Office Action 2 for U.S. Appl. No. 15/452,412, dated Nov. 14, 2017.
Response to Office Action 2 for U.S. Appl. No. 15/452,412, dated Feb. 13, 2018.
Office Action 3 for U.S. Appl. No. 15/452,412, dated Mar. 7, 2018.
Response to Office Action 3 for U.S. Appl. No. 15/452,412, dated Jun. 6, 2018.
Notice of Allowance for U.S. Appl. No. 15/452,412, dated Jul. 13, 2018.
Notice of Allowance for U.S. Appl. No. 15/910,922, dated Apr. 3, 2019.
Igel, C. and Husken, M., "Improving the Rprop learning algorithm", in Proc. of the 2nd Int. Symposium on Neural Computation (NC'2000), pp. 115-121, ICSC Academic Press, 2000.
R. H. Walden, "Analog-to-digital converter survey and analysis," IEEE J. Sel. Areas Commun., vol. 51, pp. 539-548, 1999.
Office Action 1 for U.S. Appl. No. 15/073,626, dated Sep. 16, 2016.
Response to Office Action 1 for U.S. Appl. No. 15/073,626, dated Dec. 16, 2016.
Notice of Allowance for U.S. Appl. No. 15/073,626, dated Apr. 25, 2017.
Notice of Allowance for U.S. Appl. No. 15/452,155, dated Jun. 11, 2019.

\* cited by examiner

REAL-TIME TIME-DIFFERENCE-OF-ARRIVAL (TDOA) ESTIMATION VIA MULTI-INPUT COGNITIVE SIGNAL PROCESSOR

CROSS-REFERENCE TO RELATED APPLICATIONS

The present application is ALSO a Continuation-in-Part Application of U.S. Non-Provisional application Ser. No. 15/910,821, filed on Mar. 2, 2018, entitled, "Cognitive Signal Processor, which is a Non-Provisional Application of U.S. Provisional Patent Application No. 62/500,889, filed on May 3, 2017, entitled, "Hardware Design and Implementation of Cognitive Signal Processor," the entirety of which are incorporated herein by reference.

The present application is ALSO a Continuation-in-Part Application of U.S. Non-Provisional application Ser. No. 15/910,922, filed on Mar. 2, 2018, entitled, "System for Parallelized Cognitive Signal Denoising," which is a Non-Provisional Application of U.S. Provisional Patent Application No. 62/500,966, filed on May 3, 2017, entitled, "Parallelized Cognitive Signal Denoising Architecture," the entirety of which are incorporated herein by reference. U.S. application Ser. No. 15/910,922 is a Continuation-in-Part Application of U.S. Non-Provisional application Ser. No. 15/452,412, filed in the United States on Mar. 7, 2017, issued as U.S. Pat. No. 10,153,806 on Dec. 11, 2018, entitled, "Cognitive Architecture for Wideband, Low-Power, Real-Time Signal Denoising,", which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/910,922 is also a Continuation-in-Part Application of U.S. Non-Provisional application Ser. No. 15/631,307, filed on Jun. 23, 2017, which has issued as U.S. Pat. No. 10,162,378, entitled, "A Neuromorphic Processor for Wideband Signal Analysis," which is a Non-Provisional Application of U.S. Provisional Application No. 62/379,634, filed in the United States on Aug. 25, 2016, entitled, "A Neuromorphic Processor for Wideband Signal Analysis," the entirety of which is incorporated herein by reference. U.S. application Ser. No. 15/631,307, issued as U.S. Pat. No. 10,162,378, is a Continuation-in-Part Application of U.S. application Ser. No. 15/073,626, filed on Mar. 17, 2016, now issued as U.S. Pat. No. 9,749,007, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. application Ser. No. 15/631,307, issued as U.S. Pat. No. 10,162,378, is ALSO a Continuation-in-Part Application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/452,155 is a Continuation-in-Part application of U.S. application Ser. No. 15/073,626, filed in the United States on Mar. 17, 2016, issued as U.S. Pat. No. 9,749,007, entitled, "Cognitive Blind Source Separator," which is a Non-Provisional Application of U.S. Provisional Application No. 62/135,539, filed in the United States on Mar. 19, 2015, entitled, "Cognitive Blind Source Separator," the entirety of which are incorporated herein by reference.

U.S. application Ser. No. 15/631,307, issued as U.S. Pat. No. 10,162,378, is ALSO a Continuation-in-Part Application of Ser. No. 15/452,412, filed in the United States on Mar. 7, 2017, issued as U.S. Pat. No. 10,153,806 on Dec. 11, 2018, entitled, "Cognitive Architecture for Wideband, Low-Power, Real-Time Signal Denoising," which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/452,412 is a Continuation-in-Part Application of U.S. Non-Provisional application Ser. No. 15/073,626, filed on Mar. 17, 2016, issued as U.S. Pat. No. 9,749,007, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. application Ser. No. 15/910,922 is also a Continuation-in-Part Application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/910,922 is also a Continuation-in-Part Application of U.S. application Ser. No. 15/817,906, issued as U.S. Pat. No. 10,128,820 on Nov. 13, 2018, filed on Nov. 20, 2017, entitled, "Cognitive Signal Processor for Simultaneous Denoising and Blind Source Separation," which is a Non-Provisional Application of U.S. Provisional Application No. 62/447,883, filed on Jan. 18, 2017, entitled, "A Cognitive Signal Processor for Simultaneous Denoising and Blind Source Separation," the entirety of which are incorporated herein by reference. U.S. Application No. 15,817,906, issued as U.S. Pat. No. 10,128,820, is a Continuation-in-Part Application of U.S. application Ser. No. 15/452,412 filed on Mar. 7, 2017, entitled, "Cognitive Architecture for Wideband, Low-Power, Real-Time Signal Denoising," which is a Non-Provisional Application of U.S. Provisional Patent Application No. 62/304,623, filed on Mar. 7, 2016, entitled, "Cognitive Architecture for Wideband, Low-Power, Real-Time Signal Denoising," the entirety of which are incorporated herein by reference. U.S. application Ser. No. 15/452,412 is also a Continuation-in-Part Application of U.S. application Ser. No. 15/073,626 filed on Mar. 17, 2016, issued as U.S. Pat. No. 9,749,007, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. Application No. 15,817,906, issued as U.S. Pat. No. 10,128,820, is ALSO a Continuation-in-Part Application of U.S. application Ser. No. 15/452,155, filed on Mar. 7, 2017, which is a Non-Provisional Application of U.S. Provisional Application No. 62/304,623, filed Mar. 7, 2016, the entirety of which are hereby incorporated by reference.

The present application is ALSO a Continuation-in-Part Application of U.S. application Ser. No. 16/108,041, filed on Aug. 21, 2018, entitled, "Efficient Cognitive Signal Denoising with Sparse Output Layer," which is a Non-Provisional Application of U.S. Provisional Application No. 62/574,001, filed in the United States on Oct. 18, 2017, entitled, "Efficient Cognitive Signal Denoising with Sparse Output Layers," the entirety of which are incorporated herein by reference. U.S. application Ser. No. 16/108,041 is also a Non-Provisional Application of U.S. Provisional Application No. 62/576,905, filed in the United States on Oct. 25, 2017, entitled, "Cognitive Denoising of Nonstationary Signal Using Time Varying Reservoir Computer," the entirety of which is hereby incorporated by reference. U.S. application Ser. No. 16/108,041 is a Continuation-in-Part Application of U.S. application Ser. No. 15/452,412, filed in the United States on Mar. 7, 2017, now issued as U.S. Pat. No. 10,153,806 on Dec. 11, 2018, entitled, "Cognitive Architecture for Wideband, Low-Power, Real-Time Signal Denoising," which is a Continuation-in-Part Application of U.S. application Ser. No. 15/073,626, filed on Mar. 17, 2016, now issued as U.S. Pat. No. 9,749,007, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. application Ser. No. 15/452,412, issued as U.S. Pat. No. 10,153,806, is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which is incorporated herein by reference. U.S. application Ser. No. 16/108,041 is also a Continuation-in-Part Application of U.S. application Ser. No. 15/910,821, filed in the United States on Mar. 2, 2018, entitled, "Cognitive Signal Processor," which is a Non-Provisional Application of U.S. Provisional Patent Application No. 62/500,889, filed in the United States on May 3, 2017, entitled, "Hardware Design and Implementation of Cognitive Signal Processor," the entirety of which are incorporated herein by reference. U.S. application Ser. No. 16/108,041 is also a Continuation-in-Part Application of U.S. application Ser. No. 15/910,922, filed in the United States on Mar. 2, 2018, entitled, "System for Parallelized Cognitive Signal Denoising," which is a Continuation-in-Part Application of U.S. application Ser. No. 15/452,412, issued as U.S. Pat. No. 10,153,806, is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which is incorporated herein by reference. U.S. application Ser. No. 15/910,922 is also a Continuation-in-Part application of U.S. Non-Provisional application Ser. No. 15/631,307, filed in the United States on Jun. 23, 2017, which is a Non-Provisional Application of U.S. Provisional Application No. 62/379,634, filed in the United States on Aug. 25, 2016, the entirety of which is hereby incorporated by reference. U.S. application Ser. No. 15/910,922 is also a Continuation-in-Part Application of U.S. Non-Provisional application Ser. No. 15/452,155, filed in the United States on Mar. 7, 2017, which is a Non-Provisional Application of U.S. Provisional Application No. 62/304,623, filed in the United States on Mar. 7, 2016, the entirety of which are hereby incorporated by reference. U.S. application Ser. No. 15/910,922 is also a Continuation-in-Part Application of U.S. Non-Provisional application Ser. No. 15/817,906, filed in the United States on Nov. 20, 2017, issued as U.S. Pat. No. 10,128,820 on Nov. 13, 2018, which is a Non-Provisional Application of U.S. Provisional Application No. 62/447,883, filed in the United States on Jan. 18, 2017, the entirety of which is hereby incorporated by reference. U.S. application Ser. No. 15/910,922 is also a Non-Provisional Patent Application of U.S. Provisional Application No. 62/500,966, filed in the United States on May 3, 2017, the entirety of which is hereby incorporated by reference. U.S. application Ser. No. 16/108,041 is also a Continuation-in-Part Application of U.S. Non-Provisional application Ser. No. 15/817,906, issued as U.S. Pat. No. 10,128,820 on Nov. 13, 2018, filed in the United States on Nov. 20, 2017, entitled, "Cognitive Signal Processor for Simultaneous Denoising and Blind Source Separation," which is a Non-Provisional Patent Application of U.S. Provisional Application No. 62/447,883, filed on Jan. 18, 2017, the entirety of which is incorporated herein by reference. U.S. Non-Provisional application Ser. No. 15/817,906, issued as U.S. Pat. No. 10,128,820, is a Continuation-in-Part Application of U.S. Non-Provisional application Ser. No. 15/452,412, filed on Mar. 7, 2017, now issued as U.S. Pat. No. 10,153,806, which is a Continuation-in-Part Application of U.S. Non-Provisional application Ser. No. 15/073,626, filed on Mar. 17, 2016, now issued as U.S. Pat. No. 9,749,007, which is a Non-Provisional Application of U.S. Provisional Patent Application No. 62/135,539, filed on Mar. 19, 2015, the entirety of which are incorporated herein by reference. U.S. Non-Provisional application Ser. No. 15/452,412, issued as U.S. Pat. No. 10,153,806, is ALSO a Non-Provisional Application of U.S. Provisional Patent Application No. 62/304,623, filed Mar. 7, 2016, the entirety of which is incorporated herein by reference. U.S. Non-Provisional application Ser. No. 15/817,906, issued as U.S. Pat. No. 10,128,820, is also a Continuation-in-Part application of U.S. Non-Provisional application Ser. No. 15/452,155, filed on Mar. 7, 2017, which is a Non-Provisional Application of U.S. Provisional Application No. 62/304,623, filed Mar. 7, 2016, the entirety of which are hereby incorporated by reference.

The present application is ALSO a Continuation-in-Part Application of U.S. Non-Provisional application Ser. No. 16/112,071, filed on Aug. 24, 2018, entitled, "Cognitive Denoising of Nonstationary Signals Using Time Varying Reservoir Computer," which is a Non-Provisional Application of U.S. Provisional Application No. 62/576,905, filed in the United States on Oct. 25, 2017, entitled, "Cognitive Denoising of Nonstationary Signal Using Time Varying Reservoir Computer," the entirety of which are incorporated herein by reference. U.S. application Ser. No. 16/112,071 is also a Non-Provisional Application of U.S. Provisional Application No. 62/574,001, filed in the United States on Oct. 18, 2017, entitled, "Efficient Cognitive Signal Denoising with Sparse Output Layers," the entirety of which is hereby incorporated by reference. U.S. Non-Provisional application Ser. No. 16/112,071 is also a Continuation-in-Part Application of U.S. Non-Provisional application Ser. No. 15/452,412, filed on Mar. 7, 2017, issued as U.S. Pat. No. 10,153,806 filed on Dec. 11, 2018, entitled, "Cognitive Architecture for Wideband, Low-Power, Real-Time Signal Denoising," which is a Non-Provisional Application of U.S. Provisional Patent Application No. 62/304,623, filed on Mar. 7, 2016, entitled, "Cognitive Architecture for Wideband, Low-Power, Real-Time Signal Denoising," the entirety of which are incorporated herein by reference. U.S. application Ser. No. 15/452,412, issued as U.S. Pat. No. 10,153,806, is also a Continuation-in-Part Application of U.S. Pat. No. 9,749,007, filed on Aug. 29, 2017, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. Non-Provisional application Ser. No. 16/112,071 is also a Continuation-in-Part Application of U.S. Non-Provisional application Ser. No. 15/631,307, filed on Jun. 23, 2017, entitled, "A Neuromorphic Processor for Wideband Signal Analysis," which is a Non-Provisional Application of U.S. Provisional Application No. 62/379,634, filed in the United States on Aug. 25, 2016, entitled, "A Neuromorphic Processor for Wideband Signal Analysis," the entirety of which is incorporated herein by reference. U.S. application Ser. No. 15/631,307 is also a Continuation-in-Part application of U.S. application Ser. No. 15/073,626, filed in the United States on Mar. 17, 2016, issued as U.S. Pat. No. 9,749,007, entitled "Cognitive Blind Source Separator," which is a Non-Provisional Application of U.S. Provisional Application No. 62/135,539, filed on Mar. 19, 2015, entitled, "Cognitive Blind Source Separator," the entirety of which are incorporated herein by reference. U.S. application Ser. No. 15/631,307 is also a Continuation-in-Part application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/452,155 is a Continuation-in-Part application of U.S. application Ser. No. 15/073,626, filed in the United States on Mar. 17, 2016, issued as U.S. Pat. No. 9,749,007, entitled, "Cognitive Blind Source Separator," which is a Non-Provisional Application of U.S. Provisional Application No. 62/135,539, filed in the United States on Mar. 19, 2015, entitled, "Cognitive Blind Source Separator," the entirety of which are incorporated herein by reference. U.S. application Ser. No. 15/631,307 is also a Continuation-in-Part application of U.S. application Ser. No. 15/452,412, filed in the United States on Mar. 7, 2017, issued as U.S. Pat. No. 10,153,805 on Dec. 11, 2018, entitled, "Cognitive Architecture for Wideband, Low-Power, Real-Time Signal Denoising," which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/452,412, issued as U.S. Pat. No. 10,153,806, is a Continuation-in-Part application of U.S. Non-Provisional application Ser. No. 15/073,626, filed on Mar. 17, 2016, issued as U.S. Pat. No. 9,749,007, entitled, "Cognitive Blind Source Separator," which is a Non-Provisional Application of U.S. Provisional Patent Application No. 62/135,539, filed on Mar. 19, 2015, entitled, "Cognitive Blind Source Separator," the entirety of which are incorporated herein by reference. U.S. Non-Provisional application Ser. No. 16/112,071 is also a Continuation-in-Part Application of U.S. Non-Provisional application Ser. No. 15/910,821, filed on Mar. 2, 2018, entitled, "Cognitive Signal Processor," which is a Non-Provisional Application of U.S. Provisional Patent Application No. 62/500,889, filed on May 3, 2017, entitled, "Hardware Design and Implementation of Cognitive Signal Processor," the entirety of which are incorporated herein by reference. U.S. Non-Provisional application Ser. No. 16/112,071 is also a Continuation-in-Part Application of U.S. Non-Provisional application Ser. No. 15/910,922, filed on Mar. 2, 2018, entitled, "System for Parallelized Cognitive Signal Denoising," which is a Non-Provisional Application of U.S. Provisional Patent Application No. 62/500,966, filed on May 3, 2017, entitled, "Parallelized Cognitive Signal Denoising Architecture," the entirety of which are incorporated herein by reference. U.S. application Ser. No. 15/910,922 is a Continuation-in-Part Application of U.S. Non-Provisional application Ser. No. 15/452,412, filed in the United States on Mar. 7, 2017, now issued as U.S. Pat. No. 10,153,806 on Dec. 11, 2018, entitled, "Cognitive Architecture for Wideband, Low-Power, Real-Time Signal Denoising," which is a Non-Provisional Application of U.S. Provisional Patent Application No. 62/304,623, filed Mar. 7, 2016, entitled, "Cognitive Architecture for Wideband, Low-Power, Real-Time Signal Denoising", the entirety of which are incorporated herein by reference. U.S. application Ser. No. 15/910,922 is also a Continuation-in-Part Application of U.S. Non-Provisional application Ser. No. 15/631,307, filed on Jun. 23, 2017, entitled, "A Neuromorphic Processor for Wideband Signal Analysis," which is a Non-Provisional Application of U.S. Provisional Application No. 62/379,634, filed in the United States on Aug. 25, 2016, entitled, "A Neuromorphic Processor for Wideband Signal Analysis," the entirety of which is incorporated herein by reference. U.S. application Ser. No. 15/910,922 is also a Continuation-in-Part Application of U.S. application Ser. No. 15/452,155, filed in the United States on Mar. 7, 2017, entitled, "Adaptive Blind Source Separator for Ultra-Wide Bandwidth Signal Tracking," which is a Non-Provisional Application of U.S. Provisional Application No. 62/304,623, filed in the United States on Mar. 7, 2016, entitled, "Cognitive Architecture for Wideband, Low-Power, Real-Time Signal Denoising," the entirety of which are incorporated herein by reference. U.S. application Ser. No. 15/910,922 is also a Continuation-in-Part Application of U.S. application Ser. No. 15/817,906, filed on Nov. 20, 2017, now issued as U.S. Pat. No. 10,128,820, entitled, "Cognitive Signal Processor for Simultaneous Denoising and Blind Source Separation," which is a Non-Provisional Application of U.S. Provisional Application No. 62/447,883, filed on Jan. 18, 2017, entitled, "A Cognitive Signal Processor for Simultaneous Denoising and Blind Source Separation," the entirety of which are incorporated herein by reference.

The present application is ALSO a Non-Provisional Application of U.S. Provisional Application No. 62/642,455, filed in the United States on Mar. 13, 2018, entitled, "Online TDOA Estimation via Multi-Input Cognitive Signal Processor," the entirety of which is incorporated herein by reference.

BACKGROUND OF INVENTION

(1) Field of Invention

The present invention relates to a system for denoising multiple input signals and, more particularly, to a system for denoising multiple input signals and simultaneously estimating in real-time the time-difference-of-arrival (TDOA) values of incoming pulse waveforms.

(2) Description of Related Art

State-of-the-art systems for detecting, localizing, and classifying source emitters from passive radio frequency (RF) antennas over an ultra-wide bandwidth (>30 Gigahertz (GHz)) require high rate analog-to-digital converters (ADCs). Such high-rate ADCs are expensive and power hungry, and due to fundamental physical limits (such as the Walden curve described in Literature Reference No. 10 in the List of Incorporated Literature References), are not capable of achieving the sampling rate needed to capture the ultra-wide bandwidth. To mitigate this, state-of-the-art Electronic Support Measures (ESM) systems either use spectrum sweeping (which is too slow to handle agile emitters) or a suite of digital channelizers, which have large size, weight, and power requirements. In addition, the detection, localization, and classification algorithms that state-of-the-art ESM systems use are typically based on the fast Fourier transform, with high computational complexity and memory requirements that make it difficult to operate in real-time over an ultra-wide bandwidth.

Conventional methods for denoising fall into two categories: filter-based methods and training-based approaches. Filter-based methods use filtering to smooth out noise from a signal, but are too simplistic to simultaneously maintain the low-frequency long-term trends of a signal while adapting to the high-frequency abrupt transitions. Training-based methods rely on a "dictionary" that models the signals of interest. Such a dictionary must be trained in an offline process, and requires training data that may not be available. In addition, the dictionary often requires a large amount of memory and computation to be stored and leveraged on the platform, making such approaches infeasible for ultra-low SWaP (size, weight, and power) systems.

Conventional methods for time delay estimation include cross-correlation approaches and adaptive filtering methods. Cross-correlation approaches estimate delays as peaks in the cross-correlation between the received signals, but perform poorly in low signal-to-noise ratio (SNR) environments, and also require knowledge of signal and noise statistics in order to be applied (see Literature Reference No. 4). Adaptive filtering techniques, such as Least Means-Square (LMS), normalized LMS, Least Mean-Fourth (LMF), and Recursive Least Squares (RLS), have proven to be more effective than cross-correlation methods for estimating time delays in low SNR environments, especially when signal and noise statistics are unknown (see Literature Reference No. 1). However, because they don't leverage the frequency content of the signal, such methods can only estimate a single delay. These methods can't handle a scenario with multiple pulses with different angles (or directions) relative to a system of antennas from which a signal (or signals) is coming, and that overlap in time. Finally, methods for angle of arrival estimation, such as MUSIC (see Literature Reference No. 2), are not known to be robust to significant noise, require a priori knowledge of the number of source components, and assume that these sources are uncorrelated.

Thus, a continuing need exists for a system that can simultaneously denoise multiple input signals over a large bandwidth and estimate, in real-time, the time-difference-of-arrival (TDOA) and angles of arrival of the incoming pulse waveforms.

SUMMARY OF INVENTION

The present invention relates to a system for denoising multiple input signals and, more particularly, to a system for denoising multiple input signals and simultaneously estimating in real-time the time-difference-of-arrival (TDOA) values of incoming pulse waveforms. The system comprises a multi-input cognitive signal processor (CSP) and a non-transitory computer-readable medium having executable instructions encoded thereon such that when executed, the multi-input CSP performs multiple operations. The system receives a mixture of input signals from an antenna a and an antenna b; predicts and temporally de-noises an input signal a received from antenna a using a first input of the multi-input CSP, resulting in a de-noised state vector for input signal a; predicts and temporally de-noises an input signal b received from antenna b using a second input of the multi-input CSP, resulting in a de-noised state vector for input signal b; uses the de-noised state vectors for one of input signals a and b, cross-predicts and spatially de-noises the other of the de-noised state vectors for input signals a and b; and estimates time-difference-of-arrival (TDOA) values of signal pulses to each of antennas a and b.

In another aspect, the TDOA values are converted into estimated angles of arrival for each signal pulse.

In another aspect, where in predicting and temporally de-noising each of input signals a and b, the multi-input CSP further performs operations of linearly mapping one of input signals a and b into a reservoir computer (RC); generating a high-dimensional state-space representation of the mixture of input signals from antennas a and b; generating a delay embedded state signal from a reservoir state of one of input signals a and b; and temporally de-noising the reservoir state, resulting in the de-noised state vector for one of input signals a and b.

In another aspect, in cross-predicting the de-noised state vector for input signal b by the de-noised state vector for input signal a, each element of the de-noised state vector for input signal a is sent into a length-L delay embedding and then combined in a weighted sum with a set of output filter coefficients related to input signal a to obtain a spatially de-noised state vector for input signal b.

In another aspect, the set of output filter coefficients related to input signal a is adapted via gradient descent using a cross-prediction error function that is a difference between the de-noised state vector for input signal a and the de-noised state vector for input signal b.

In another aspect, in estimating TDOA values between a pulse arriving at antenna a and antenna b at different times, the multi-input CSP further performs an operation of comparing the set of output filter coefficients related to input signal a, $C_{n1}^{ab}, \ldots C_{n(L+1)}^{ab}$, to a set of output filter coefficients related to input signal b, $C_{n1}^{ba}, \ldots C_{n(L+1)}^{ba}$, wherein filter coefficients for antenna a that exceed a predetermined threshold correspond to a positive pulse delay $\tau_{ab}=1$, and filter coefficients for antenna b that exceed the predetermined threshold correspond to a negative pulse delay $\tau_{ab}=-1$.

In another aspect, for each pulse delay $\tau_{ab}$, an angle of arrival $\theta_{ab}$ for the signal pulse relative to antenna a is calculated as $$\theta_{ab} = \sin^{-1} \frac{c\tau_{ab}}{d},$$

where a denotes a distance between antenna a and antenna b, and c is the speed of light.

In another aspect, the estimated angles of arrival are used to geolocate at least one mobile communication device.

In another aspect, the estimated angles of arrival are used to detect at least one of a direction and a location of at least one radio frequency emitting device.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
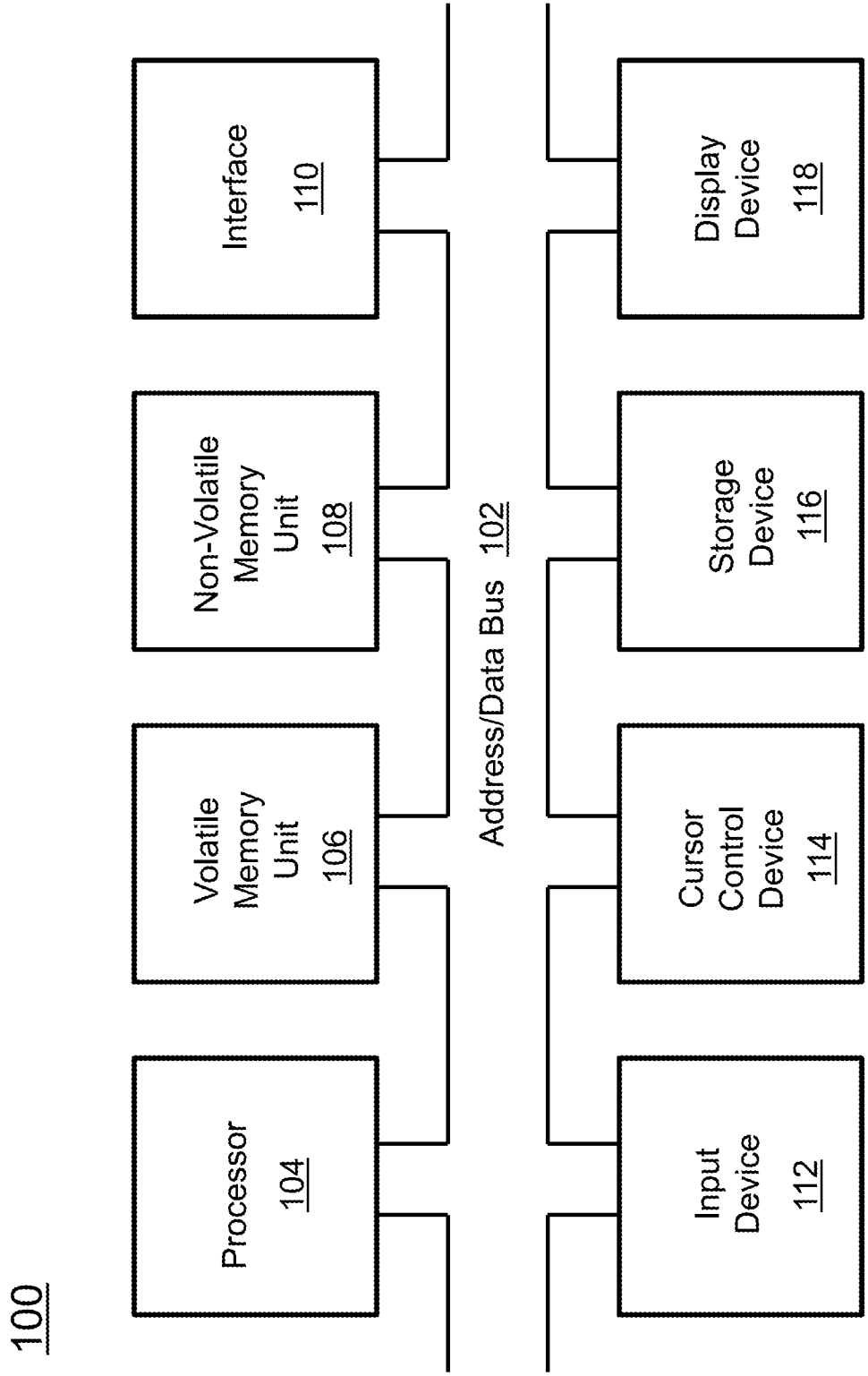
FIG. 1 is a block diagram depicting the components of a system for denoising and time-difference-of-arrival (TDOA) estimation of multiple input signals according to some embodiments of the present disclosure.

The present invention relates to a system for denoising multiple input signals and, more particularly, to a system for denoising multiple input signals and simultaneously estimating in real-time the time-difference-of-arrival (TDOA) values of incoming pulse waveforms. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. A. Emadzadeh, C. Lopes, and J. Speyer, "Online Time Delay Estimation of Pulsar Signals for Relative Navigation using Adaptive Filters", in Proc. of IEEE Position, Location, and Navigation (PLN) Symposium, pp. 714-719, 2008.
2. E. Fishler and H. V. Poort, "Estimation of the number of sources in unbalanced arrays via information theoretic criteria," IEEE Trans. on Signal Processing, vol. 53, no. 9, pp 3543-3553, 2005.
3. H. Jaeger, et al., "Harnessing nonlinearity: Predicting chaotic systems and saving energy in wireless communications," Science, vol. 304, no. 5667, pp. 78-80, 2004.
4. C. Knapp and G. Carter, "The Generalized Correlation Method for Estimation of Time Delay," IEEE Transactions of Accoustics, Speech, and Signal Processing, vol. 24, no. 4, pp. 320-327, 1976.
5. R. Legenstein, et al., "Edge of Chaos and Prediction of Computational Performance for Neural Microcircuit Models," Neural Networks, 20(3), 2007.
6. W. Maass, "Liquid Computing", in Proc. of the Conference CiE'07: COMPUTABILITY IN EUROPE 2007, Siena (Italy), 2007.
7. S. Mann and S. Haykin, "The Chirplet transform: A generalization of Gabor's logon transform", in Proc. Vision Interface 1991, pp. 205-212, (3-7 Jun. 1991).
8. A. Oppenheim and R. Schafer, "Chapter 7: Filter Design Techniques", in Discrete-Time Signal Processing, Second Edition, pp. 439-540, 1999.
9. F. Takens, "Detecting Strange Attractors in Turbulence," Dynamical Systems and Turbulence, Lecture Notes in Mathematics Vol. 898, 1981.
10. R. Walden, "Analog-to-digital converter survey and analysis," IEEE J. Sel. Areas Commun., vol. 51, pp. 539-548, 1999.
11. H. Yap, et al., "A First Analysis of the Stability of Takens' Embedding," in Proc. of the IEEE Global Conference on Signal and Information Processing (GlobalSIP) symposium on Information Processing for Big Data, December 2014.

(2) Principal Aspects

Various embodiments of the invention include three "principal" aspects. The first is a system for denoising and time-difference-of-arrival (TDOA) for multiple input signals. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
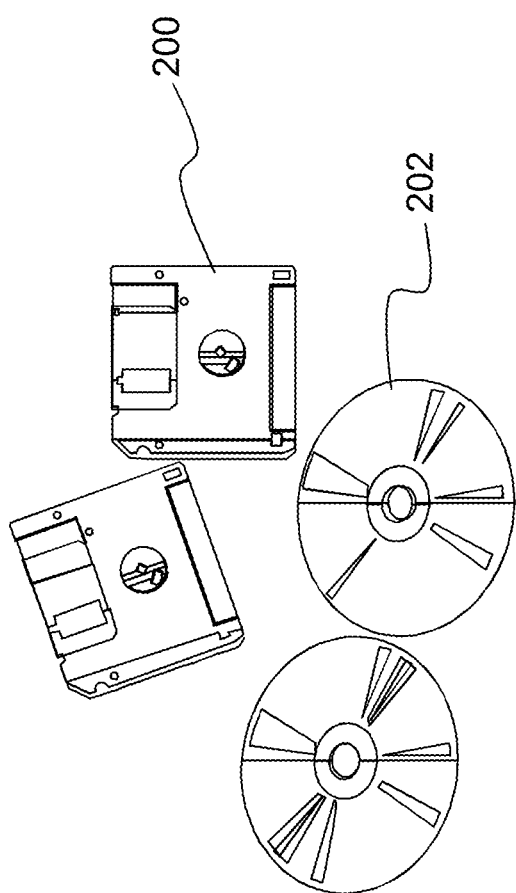
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a multi-input "cognitive" signal processor (CSP) that can simultaneously (1) de-noise two or more input signals sampled from antennas and containing mixtures of pulse waveforms over a very large (>30 Gigahertz (GHz)) bandwidth; and (2) estimate in real-time the time-difference-of-arrival (TDOA) and, consequently, the angles of arrival of the incoming pulse waveforms.

A CSP consists of three primary components. The first component is a reservoir computer (RC), which is a type of recurrent neural network with fixed feedback connections and trainable output. The RC accepts the mixture signals as input and maps them to a high-dimensional dynamical system known as the reservoir. The RC has a predefined number of outputs, which are generated by continually mapping the reservoir states through a set of distinct linear functions with one such function defined per output. The second component is a delay embedding. The reservoir state signals (i.e., outputs of the reservoir computer) are continuously passed through the delay embedding, which creates a finite temporal record of the values of the reservoir state. The third component is a short-time prediction module (or weight adaption module) that adapts the output weights of the reservoir via gradient descent to produce a prediction of the input signal a small time-step in the future. Since the noise in the input signal is inherently random and unpredictable, the predicted input signal will be free of noise. The error between the predicted input signal and actual input is used by the weight adaptation module to further tune the output weights.

Figure 8:
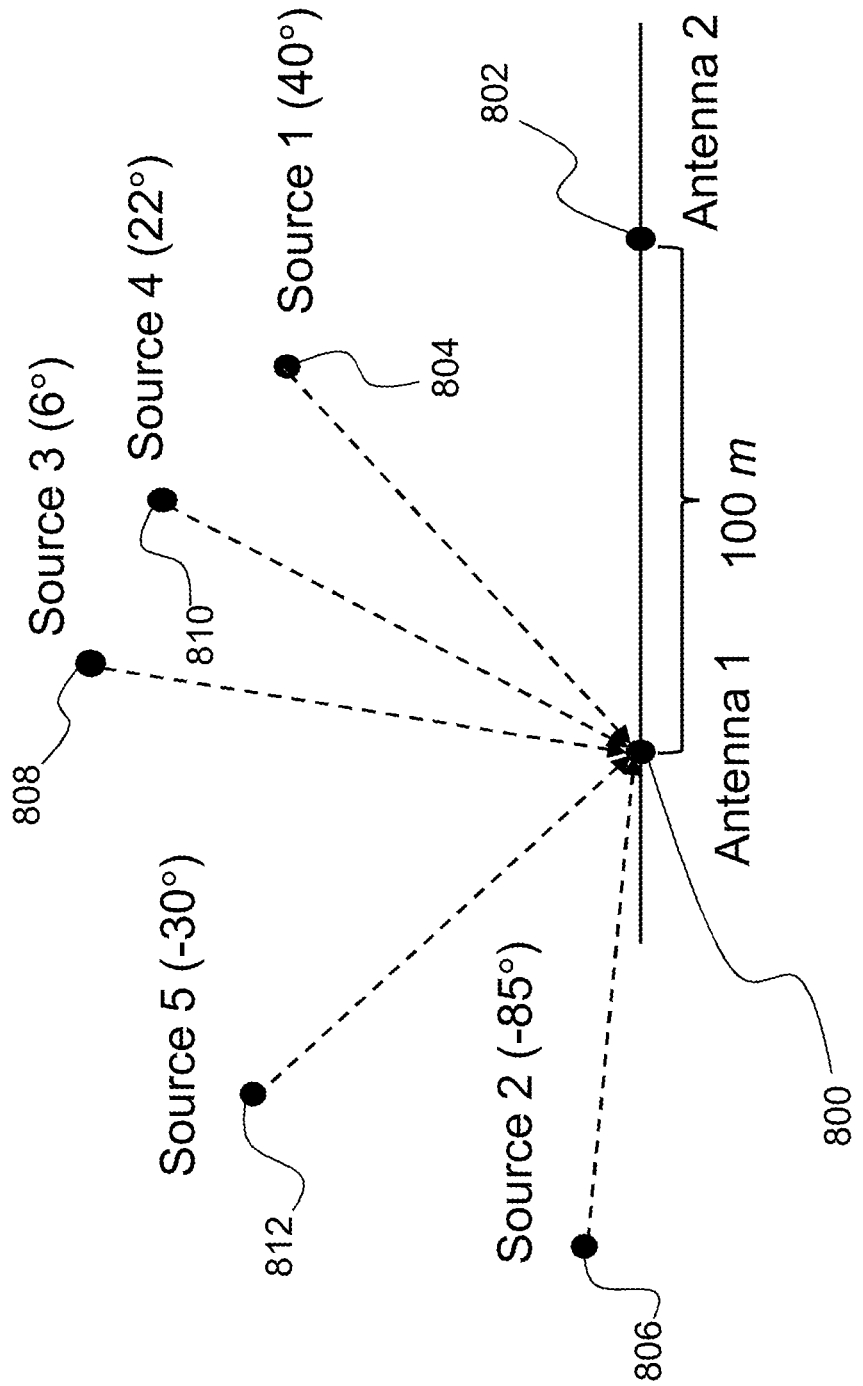
FIG. 8 is an illustration of geometry of a simulated test scenario according to some embodiments of the present disclosure.

The invention described herein builds upon previous cognitive signal processors, which perform temporal signal prediction, by extending them to process multiple inputs. Each input is predicted and temporally de-noised using its own single-input CSP, and then the de-noised states for each input are used to cross-predict and spatially de-noise the states from other inputs. From the filter coefficients used for this cross-prediction, the system according to embodiments of the present disclosure estimates the TDOA of pulses to each antenna and then converts the TDOAs values into estimated angles of arrival for each detected signal pulse. An estimated angle of arrival (or direction in space) is relative to some system of antennas from which a signal (or signals) is coming, as shown in FIG. 8.

(3.1) Reservoir Computing (RC)

The cognitive signal denoising architecture described herein is based on a form of neuromorphic (brain-inspired) signal processing known as reservoir computing (see Literature Reference Nos. 3, 5, and 6). A reservoir computer is a special form of a recurrent neural network (a neural network with feedback connections) that operates by projecting the input signal into a high-dimensional reservoir state space, which contains an equivalent dynamical model of the signal generation process capturing all of the available and actionable information about the input. A reservoir has readout layers that can be trained, either off-line or online, to learn desired outputs by utilizing the state functions. Thus, an RC has the power of recurrent neural networks to model non-stationary (time-varying) processes and phenomena, but with simple readout layers and training algorithms that are both accurate and efficient.

A reservoir computer can implement an adaptable state-space filter. A linear reservoir computer has the following state-space representation:

$$\dot{x}(t) = \underline{A}x(t) + \underline{B}u(t)$$

$$y(t) = \underline{C}(t)^T x(t) + D(t)u(t),$$

where $\underline{A}$ is the reservoir connectivity matrix that determines the filter pole locations, $\underline{B}$ is the vector mapping the input to the reservoir, $\underline{C}(t)$ is the set of tunable output layer weights that map the reservoir state to the output and determine the filter zero locations, D (t) is the (rarely used) direct mapping from input to output, u(t) is the input signal, and $\underline{x}$, $\underline{\dot{x}}$, and y are elements of the state space. The output layer weights ($\underline{C}$) determine the filter zero locations.

Figure 3:
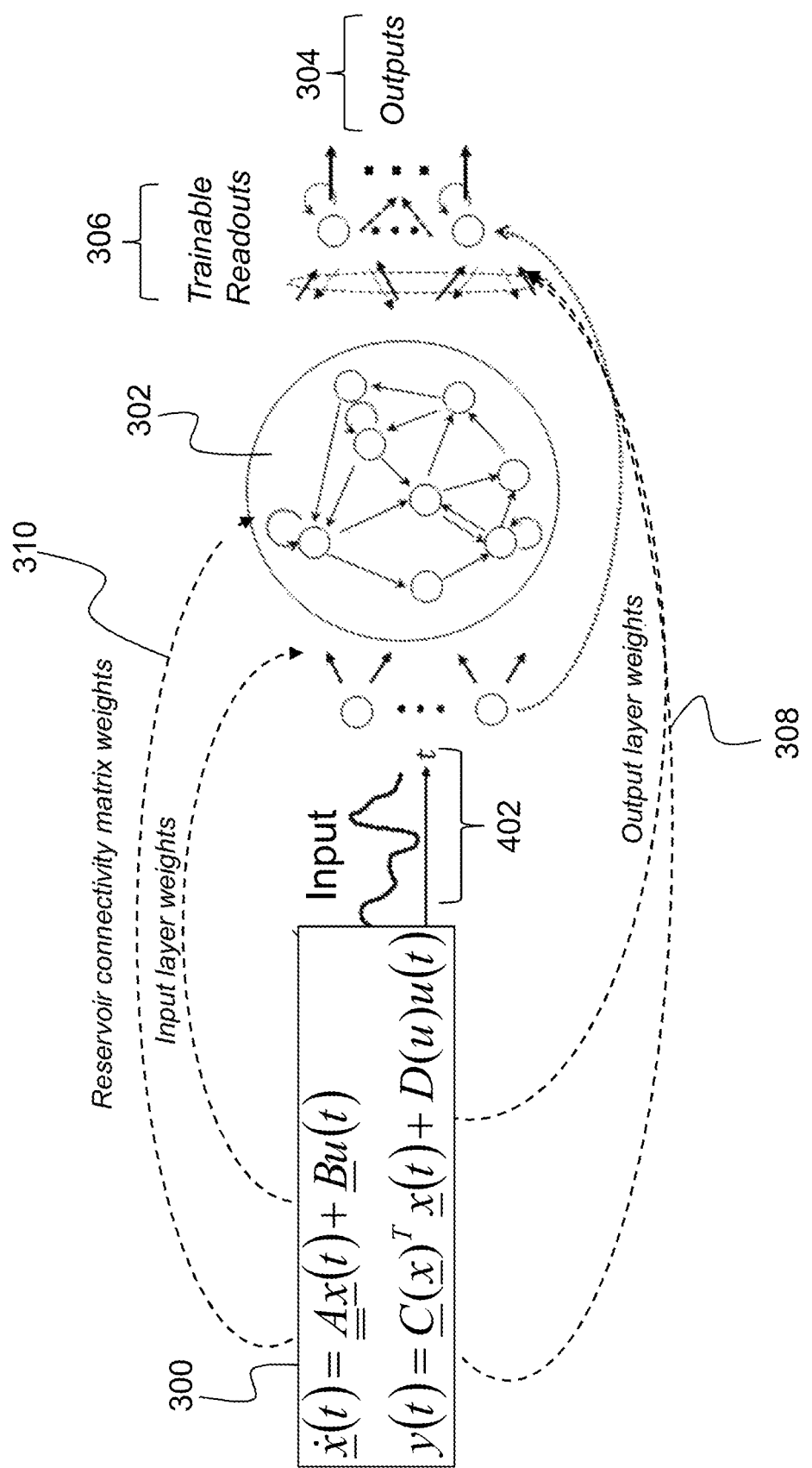
FIG. 3 is an illustration of correspondence between state-space representation components and parameters in a reservoir computer according to some embodiments of the present disclosure.

FIG. 3 depicts a reservoir computer, which maps an input signal vector 300 (or time sampled vector of the input signal) to a high-dimensional state-space 302 that models the underlying time-varying dynamics of the signal generation process, where the dimension is the size of x. The reservoir states can be mapped to useful outputs 304, including denoised inputs, signal classes, separated signals, and anomalies using trainable linear readout layers (i.e., trainable readouts 306). There is a direct correspondence between state-space representation components and parameters in the reservoir computer. As the output layer weights 308 are adaptable, a reservoir computer implements an adaptable state-space filter where the poles are fixed, but the zeros are adapted in real-time based on the input signal.

(3.1.1) Optimized Reservoir Design

In conventional reservoir computers, the weights in both the reservoir connectivity matrix ($\underline{A}$) (i.e., reservoir connectivity matrix weights 310) and the input-to-reservoir mapping vector ($\underline{B}$) are typically chosen randomly (e.g., entries of $\underline{A}$ and $\underline{B}$ can be independent, identically distributed samples from a zero-mean, unit variance Gaussian distribution). The reservoir state update requires computation proportional to the square of the number of nodes, which becomes infeasible for low-power hardware instantiations as the number of reservoir nodes increases.

Because the reservoir computer is a linear dynamical system, one can apply a linear transformation $\underline{T}$ to obtain a new state vector $\underline{\tilde{x}}(t) = \underline{T}x(t)$ and obtain the following equivalent dynamical system:

$$\dot{\tilde{x}}(t) = \underline{\hat{A}}\tilde{x}(t) + \underline{\hat{B}}u(t)$$

$$y(t) = \underline{\hat{C}}(t)^T \tilde{x}(t) + \hat{D}(t)u(t),$$

where $\underline{\hat{A}} = \underline{T}\underline{A}\underline{T}^{-1}$, $\underline{\hat{B}} = \underline{T}\underline{B}$, $\underline{\hat{C}}(t) = \underline{T}^{-1^T}\underline{C}(t)$, and $\hat{D}(t) = D(t)$.

This dynamical system has the exact same input/output behavior as the original system, but with the appropriate choice of $\underline{T}$, the reservoir transition matrix $\underline{\hat{A}}$ can be designed to have diagonal or block diagonal structure. This will enable the computation of the reservoir state update to scale linearly with the number of nodes, thus enabling efficient implementation in low-power hardware.

In the invention described herein, the reservoir state transition matrix $\underline{\hat{A}}$ is directly constructed such that it is in 2×2 block diagonal form, making the matrix sparse. Each 2×2 block in the state matrix $\underline{\hat{A}}$ corresponds to a single pole infinite impulse response (IIR) filter. Using standard IIR filter design techniques (described in Literature Reference No. 8), the placement of the pole for each 2×2 block can be selected so that the reservoir state matrix in aggregate models a bank of IIR filters. For example, for a real passive IIR filter, the matrix $\underline{\hat{A}}$ must have eigenvalues that are either purely real and negative (corresponding to purely damped modes) or eigenvalues that come in complex conjugate pairs, with negative real parts to the eigenvalues. Thus, the block-diagonal matrix $\underline{\hat{A}}$ will have the form:

$$\underline{\hat{A}} = \begin{pmatrix} \lambda_{r,1} & \lambda_{i,1} & 0 & 0 & 0 & \cdots & 0 & 0 \\ -\lambda_{i,1} & \lambda_{r,1} & 0 & 0 & 0 & \cdots & 0 & 0 \\ 0 & 0 & \lambda_{r,2} & \lambda_{i,2} & 0 & \cdots & 0 & 0 \\ 0 & 0 & -\lambda_{i,2} & \lambda_{r,2} & 0 & \cdots & 0 & 0 \\ 0 & 0 & 0 & 0 & \ddots & \ddots & \vdots & \vdots \\ \vdots & \vdots & \vdots & \vdots & \ddots & \ddots & 0 & 0 \\ 0 & 0 & 0 & 0 & \cdots & 0 & \lambda_{r,p} & \lambda_{i,p} \\ 0 & 0 & 0 & 0 & \cdots & 0 & -\lambda_{i,p} & \lambda_{r,p} \end{pmatrix}$$

Here p is the number of complex conjugate poles, with N=2p, $\{\lambda_{r,k}\}_{k=1}^{p}$ correspond to the real components of the eigenvalues (that are always negative) of $\underline{\hat{A}}$ and $\{\pm\lambda_{i,k}\}_{k=1}^{p}$ are the imaginary components of the eigenvalues of $\underline{\hat{A}}$, and N is the dimension of the matrix.

(3.2) Phase Delay Embedding

Phase delay embedding is a technique developed in dynamical system theory to model the dynamics of a chaotic system from its observation $u_0(t)$ using delayed versions of the observation as new input $\underline{u}(t)$. To use phase delay embedding theory, it is assumed that an unknown (potentially chaotic) dynamical system embedded in an N-dimensional state space has an m-dimensional attractor. This means that though the state space has N parameters, signals from the dynamical system form trajectories that all lie on an m-dimensional sub-manifold M of the state space, and can theoretically (though not practically) be specified by as few as m parameters. The phase delay embedding produces a new input $\underline{u}(t)$ from n (a predetermined number) delayed versions of the observation signal $u_0(t)$ concatenated together.

According to Taken's theorem (see Literature Reference No. 9), given fairly broad assumptions on the curvature of the sub-manifold M and the nondegenerate nature of the projection h[·], if the delay coordinate dimensionality n>2m+1, then the phase delay embedding $\underline{u}(t)$ preserves the topological structure (i.e., shape) of the dynamical system, and thus can be used to reconstruct the dynamical system from observations.

Figure 4:
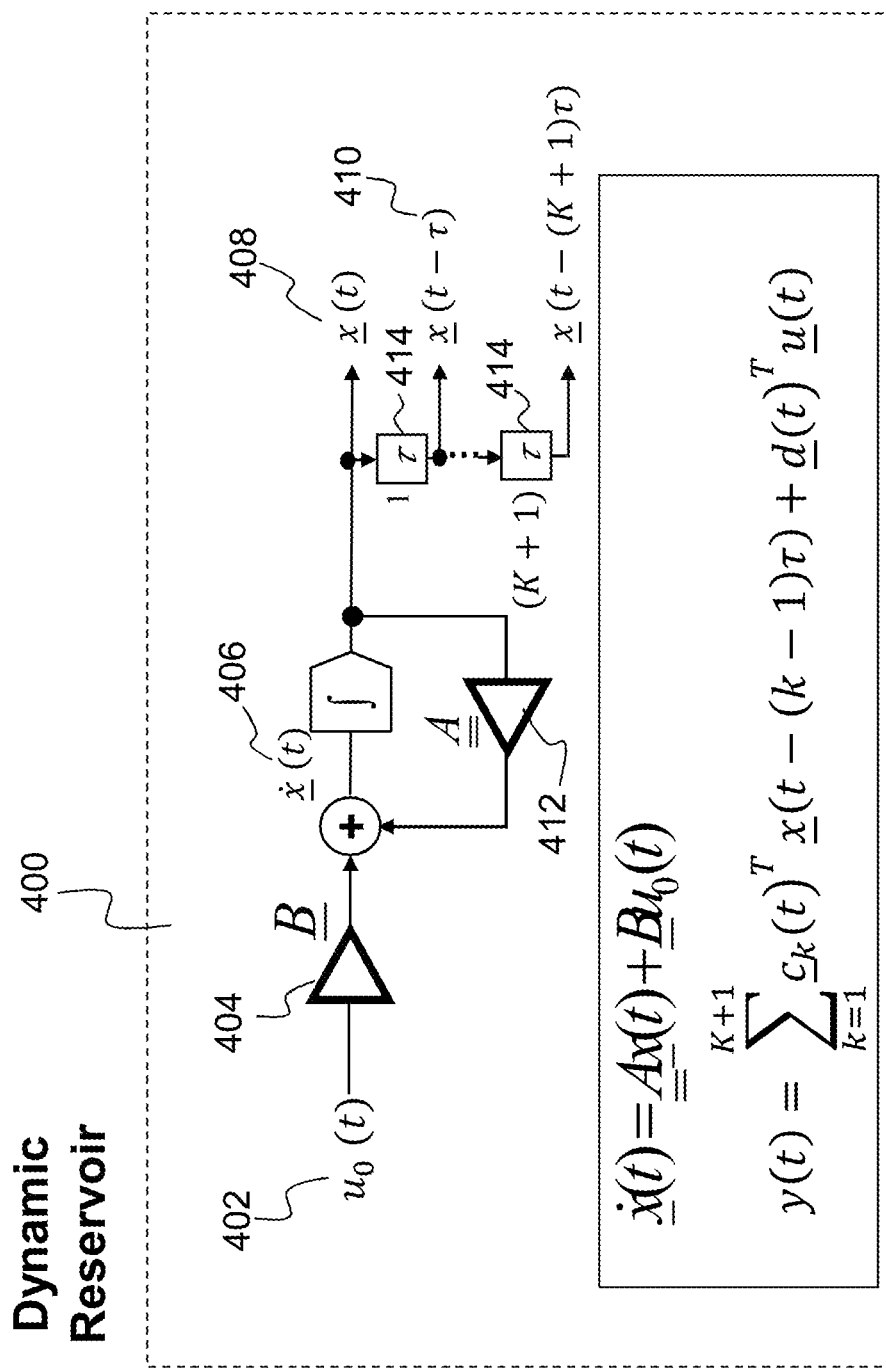
FIG. 4 is an illustration of a dynamic reservoir according to some embodiments of the present disclosure.

FIG. 4 illustrates the dynamic reservoir 400 according to embodiments of the present disclosure, which applies a delay embedding to each of the reservoir states to obtain a short-time history of reservoir dynamics (i.e., reservoir state dynamics). As shown in FIG. 4, for a given input observation 402, an input-to-reservoir mapping vector ($\underline{B}$) 404 and application of a linear transformation is used to obtain the new state vector $\underline{\tilde{x}}(t)$ 406. The linear transformation is described by the matrix $\underline{\hat{A}}$ 412. The current value of the derivatives of the states are equal to a linear combination of the current values of the states themselves and a linear combination of the input.

(3.3) Short-Time Prediction Via Gradient Descent

In this section is a description of the short-term prediction method that a CSP uses for signal denoising. Given that delay-embedded observations can effectively model dynamical system behavior, the system according to embodiments of the present disclosure leverages the time history of these reservoir state variables to perform short-term predictions of the observations. The system uses a reservoir computer to learn the following prediction function F:

$$\tilde{u}_o(t+\tau) = F[u_0(t)].$$

In the CSP according to embodiments of the present disclosure, a wideband (up to 30 GHz) frontend provides input to the dynamic reservoir. The output layer weights 308 are adapted via the gradient learning algorithm described below. The gradient descent learning algorithm is based on short-time prediction of the input signal, seeking to represent the output as a linear combination of historical reservoir states. Since noise is random and unpredictable, the predicted signal $y(t) \doteq \tilde{u}_0(t+\tau)$ will be free of noise.

The dynamic reservoir in FIG. 4 satisfies the following set of coupled ordinary differential equations (ODE):

$$\dot{x}(t) = \underline{A}\underline{x}(t) + Bu_0(t)$$

$$y(t) = \sum_{k=1}^{K+1} \underline{c}_k(t)^{(T)} \underline{x}(t-(k-1)\tau) + \underline{d}(t)^T \underline{u}(t),$$

where $\underline{u}(t) \doteq [u_0(t), u_0(t-\tau), \ldots, u_0(t-K\tau)]^T$, where K is a predetermined number, which is the same as n described above. To perform short-time prediction of the input signal, the invention described herein uses an online gradient descent algorithm. The idea is to enforce exact prediction of the current time point that is used in the delay embedding. The predicted input value at time $(t+\tau)$ is calculated from the current value of the output weights $(\bar{c}_k(t), \bar{d}(t))$ and the current and past values of the states ($\underline{x}$) and the input (u). The quadratic error function to be minimized is given by:

$$E[\underline{c}_1, \ldots, \underline{c}_{K+1}, \underline{d}] \doteq [u_0(t) - \tilde{y}(t-\tau)]^2 + \lambda_c \sum_{k=1}^{K+1} \|\underline{c}_k(t)\|^2 + \lambda_d \|\underline{d}(t)\|^2,$$

where $\lambda_c$ and $\lambda_d$ are parameters that weight the importance of the output weights $\{\underline{c}_k\}_{k=1}^{K+1}$ and $\underline{d}$, and $$\tilde{y}(t-\tau) = \sum_{k=1}^{K+1} \underline{c}_k(t)^T \underline{x}(t-k\tau) + \underline{d}(t)^T \underline{u}(t-\tau).$$

Note that $\tilde{y}(t-\tau)$ is the delayed output expressed by the delayed valued of $\underline{x}$ and u and the current values of the output weights $\{\underline{c}_k\}_{k=1}^{K+1}$ and $\underline{d}$, and thus in general $\tilde{y}(t-\tau) \neq y(t-\tau)$. However, this approximation is reasonable, and allows the system to not require storage of time histories of output weights, facilitating more efficient hardware implementation.

To minimize the quadratic error $E[\underline{c}_1, \ldots, \underline{c}_{K+1}, \underline{d}]$, the gradients of $E[\underline{c}_1, \ldots, \underline{c}_{K+1}, \underline{d}]$ are computed with respect to $\{\underline{c}_k\}_{k=1}^{K+1}$ and d. Based on these gradients, the weight updates to $\{\underline{c}_k(t)\}_{k=1}^{K+1}$ and $\underline{d}(t)$ satisfy the following ordinary differential equations (ODEs):

$$\dot{\underline{c}}_k(t) = -g_c \underline{c}_k(t) + \mu_c \tilde{\varepsilon}(t)\underline{x}(t-k\tau), k=1,2,\ldots,K+1$$

$$\dot{\underline{d}}(t) = -g_d \underline{d}(t) + \mu_d \tilde{\varepsilon}(t)\overline{u}(t-\tau),$$

where $g_c = 2\lambda_c$ and $g_d = 2\lambda_d$ are the "forgetting" rates with respect to $\{\underline{c}_k\}_{k=1}^{K+1}$ and $\underline{d}$, $\mu_c$ and $\mu_d$ are the learning rates with respect to $\{\underline{c}_k\}_{k=1}^{K+1}$ and $\underline{d}$, and $\tilde{\varepsilon}(t) \doteq u_0(t) - \tilde{y}(t-\tau)$ approximates the error signal.

The ODEs for the dynamic reservoir and the weight adaptation system can be implemented directly in analog hardware. To implement the above ODEs in software or efficient digital hardware (e.g., field-programmable gate arrays (FPGAs) or custom digital application-specific integrated circuits (ASICs)), the update equations must be discretized. In order to implement a CSP in software or digital hardware, the ODEs are converted to delay difference equations (DDEs). For a linear dynamical system with the state-space representation:

$$\dot{\underline{x}}(t) = \underline{A}\underline{x}(t) + \underline{B}u(t)$$

$$y(t) = \underline{C}(t)^T \underline{x}(t) + D(t)u(t),$$

given the discrete time-step size $\tau$, the equivalent DDE is obtained that describes the exact same filter dynamics as follows:

$$\underline{x}(t) = e^{\underline{A}\tau}\underline{x}(t-\tau) + \int_{t-\tau}^{t} e^{\underline{A}(t-s)} u(s) ds \cdot \underline{B}$$

$$y(t) = \underline{C}(t)^T \underline{x}(t) + D(t)u(t).$$

Figure 5A:
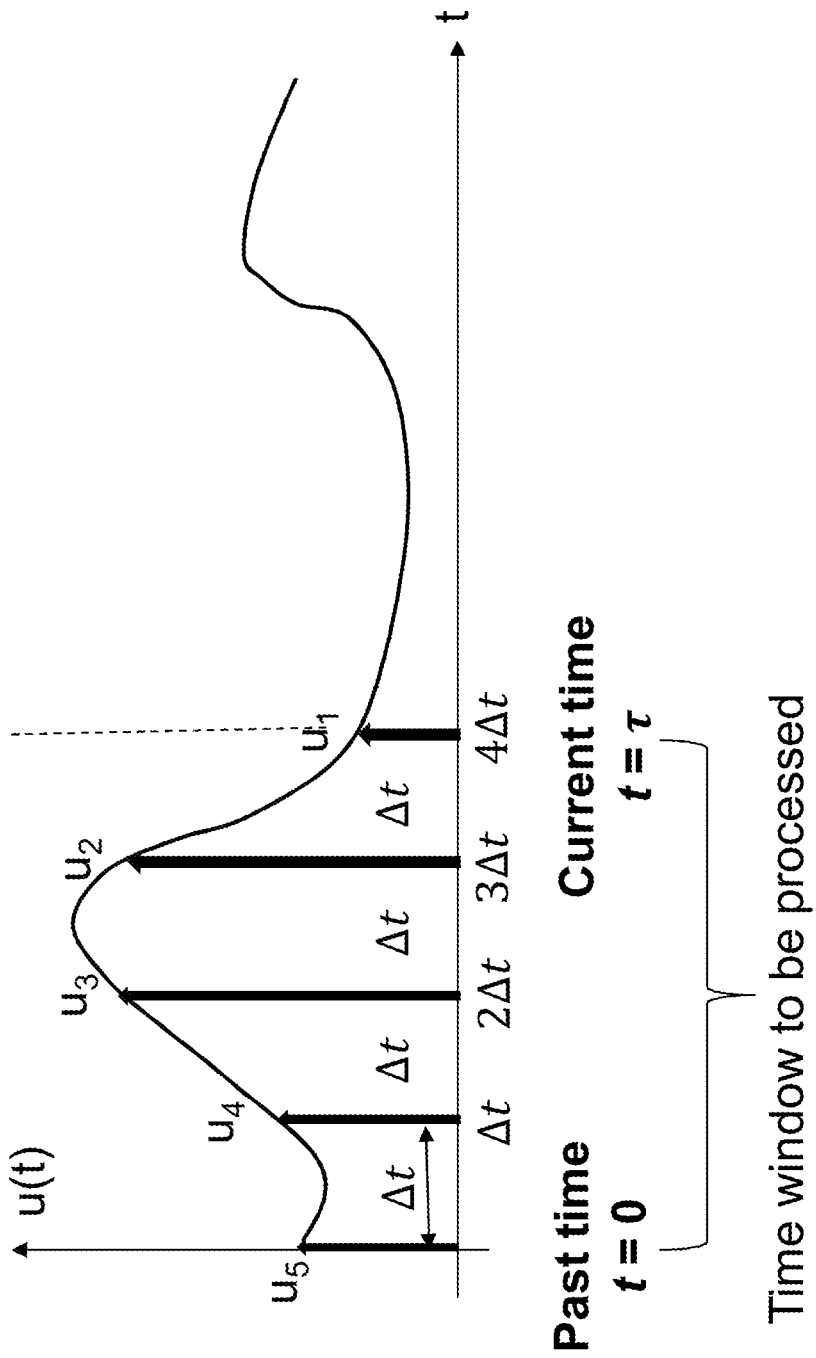
FIG. 5A is an illustration of a plot of an approximation of an input signal using uniform sampling according to some embodiments of the present disclosure.
Figure 5B:
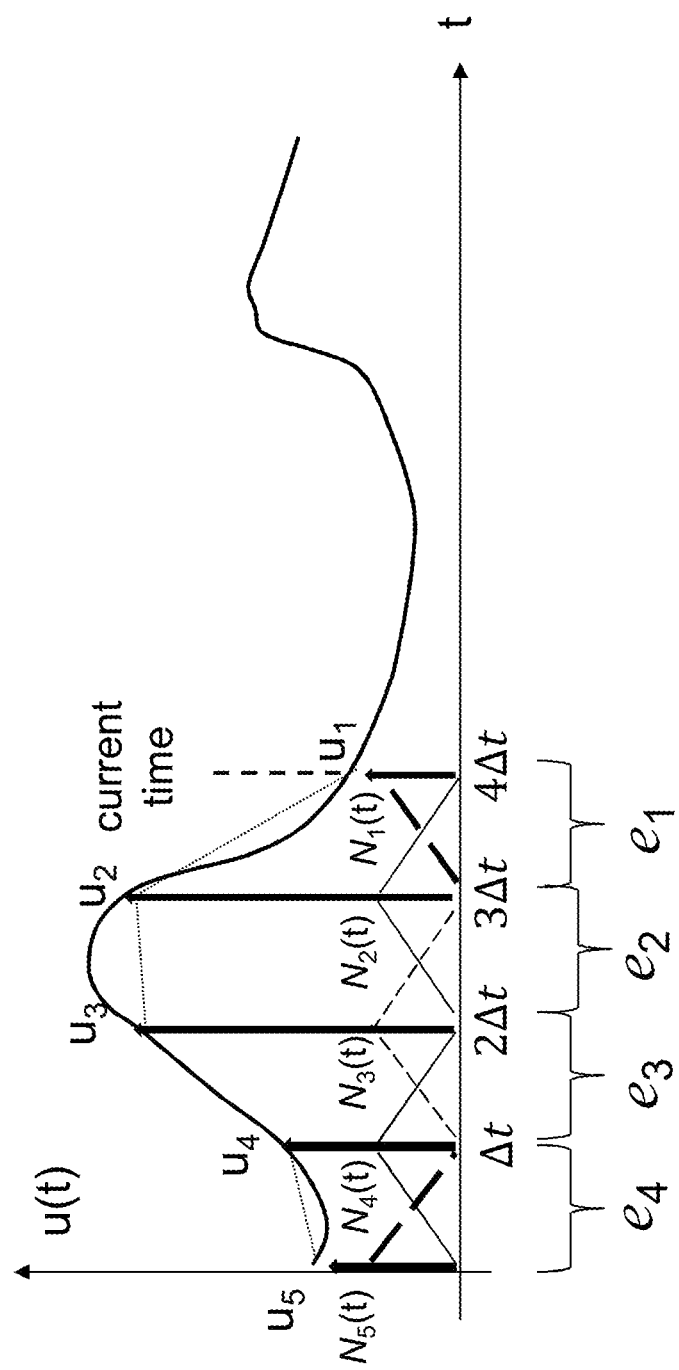
FIG. 5B is an illustration of a plot of an approximation of an input signal using a linear basis function according to some embodiments of the present disclosure.

FIG. 4 shows that the current reservoir state $\underline{x}(t)$ 408 is a function of the reservoir state at the previous time step $\underline{x}(t-\tau)$ 410 and the input signal u(t) 402 over the interval $[t-\tau, t]$, where $\tau$414 represents a discrete time-step. Since the entire continuous interval is not available in software or digital hardware, in the digital CSP, u(t) 402 is approximated over the interval using linear basis functions. Given the sampling period $\Delta t$ and input signal u(t), a set of samples $u_i \overset{\text{def}}{=} u(t-(i-1)\Delta t)$, $1 \leq i \leq n_e + 1$ is collected, where $$n_e = \frac{\tau}{\Delta t}$$

in me number of sampling intervals within the time window defined by $\tau$, as shown in FIG. 5A which depicts uniformly sampled u(t) with sampling period $\Delta t$. FIG. 5B is a plot depicting linear basis functions for approximating u(t). As illustrated in FIG. 5B, where distinct line types (e.g., solid, dashed, bold, unbolded) represent distinct functions, the input signal is approximated from the samples as $$u(t) \approx \sum_{i=1}^{n_e+1} u_i N_i(t),$$

where $N_i(t) = T(t-(i-1)\Delta t)$ is a shifted version of the triangle function T(t):

$$T(t) = \begin{cases} 1 - t/\Delta t & 0 \leq t \leq \Delta t \\ 1 + t/\Delta t & -\Delta t \leq t \leq 0 \\ 0 & \text{otherwise} \end{cases}.$$

Based on the linear basis approximation the DDE for the reservoir state $\underline{x}(t)$ becomes:

$$x(t) = e^{\underline{A}\tau}\underline{x}(t-\tau) + \sum_{i=1}^{n_e+1}\left\{u_i\int_{t-\tau}^{\tau}e^{\underline{A}(t-s)}N_i(s)ds\cdot\underline{B}\right\}.$$

Without loss of generality, set $t=\tau$. If the two auxiliary matrices $\underline{B}_{1e}{}^i$ and $\underline{B}_{2e}{}^i$ are defined as follows:

$$\underline{B}_{1e}^i \stackrel{def}{=} e^{\underline{A}(i-1)\Delta t}\int_0^{\tau}e^{\underline{A}(\tau-s)}N_1(s)ds\cdot\underline{B} = \frac{e^{\underline{A}(i-1)\Delta t}}{\Delta t}\underline{A}^{-2}(e^{\underline{A}\Delta t} - \Delta t\underline{A} - I)\underline{B}$$

$$\underline{B}_{2e}^i \stackrel{def}{=} e^{\underline{A}(i-1)\Delta t}\int_0^{\tau}e^{\underline{A}(\tau-s)}N_2(s)ds\cdot\underline{B} =$$

$$e^{\underline{A}(i-1)\Delta t}\left\{\underline{A}^{-1}(e^{\underline{A}\Delta t} - I) - \frac{1}{\Delta t}\underline{A}^{-2}(e^{\underline{A}\Delta t} - \Delta t\underline{A} - I)\right\}\underline{B},$$

then $\underline{x}(\tau)$ can be computed as:

$$\underline{x}(t) =$$

$$\underline{x}(n_e\Delta t) = \underbrace{e^{\underline{A}\tau}}_{\tilde{A}}\underline{x}(0) + \underbrace{\left[\underline{B}_{1e}^1, (\underline{B}_{2e}^1 + \underline{B}_{1e}^2), \ldots, (\underline{B}_{2e}^{n_e-1} + \underline{B}_{1e}^{n_e}), \underline{B}_{2e}^{n_e}\right]}_{B}\begin{bmatrix}u_1\\u_2\\\vdots\\u_{n_e}\\u_{n_e+1}\end{bmatrix}$$

Figure 6:
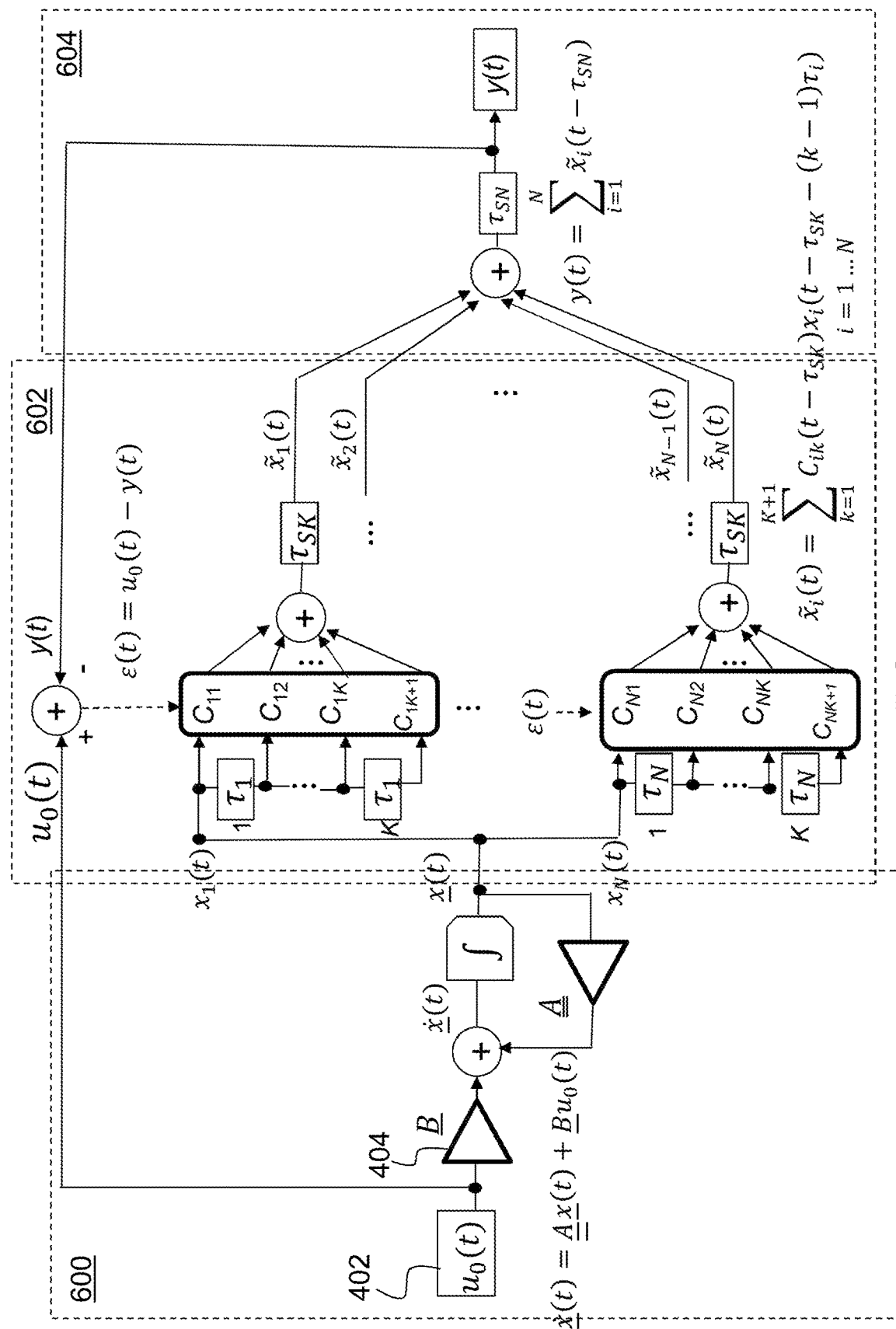
FIG. 6 is an illustration of an architecture of a single-input cognitive signal processor (CSP) according to some embodiments of the present disclosure.

Based on this, iterative updates are derived for the state ($\underline{x}$), output (y), and weights ($\{\underline{c}_k\}_{k=1}^{K+1}$ $\underline{d}$), which are summarized in Algorithm 1 below. Each required update step is achieved within one clock cycle without the need of waiting for a calculation step to be completed before a subsequent step can start. This enables a parallelized implementation of the de-noising algorithm. The architecture for a single-input cognitive signal processor implementing the above iteration is shown in FIG. 6 and is amenable to implementation on an FPGA or custom digital ASIC. The first block 600 shows the input-to-states transformation. The second layer 602 of blocks show states-to-delayed-history-of-states transformation. The third block 604 is a summing junction that combines the weighted sums of the delayed states values.

Algorithm 1: Cognitive Signal Denoising Iterative Algorithm

Initialization:

$\underline{x}[k]=\underline{0}, \underline{c}_k[K+1]=\underline{0}$ $k=1,2,\ldots,(K+1)$ Iteration (starting at n=K+2):

$$\underline{x}[n] = \tilde{\underline{A}}\underline{x}[n-1] + \tilde{\underline{B}}\begin{bmatrix}u[n]\\u[n-1]\\\vdots\\u[n-n_e]\\u[n-(n_e+1)]\end{bmatrix}$$

$\tilde{\varepsilon}[n] = u[n-1] - y[n-1]$ $\underline{c}_k[n] = (1 - \Delta t g_c)\underline{c}_k[n-1] + \Delta t\tilde{\mu}_c\tilde{\varepsilon}[n]\underline{x}[n-1-k]$ $k = 1, 2, \ldots, (K+1)$ $$y[n] = \sum_{k=1}^{K+1}\underline{c}_k[n]^T\underline{x}[n-k],$$

where x denotes a state vector, c denotes a weight matrix, A denotes a reservoir connectivity matrix, B denotes an input distribution matrix, ε denotes a current sampled value of the error signal, u denotes current sampled value of input, and y[n] denotes a current sampled value of output.

(3.4) Extension to Multi-Input CSP Via Cross-Prediction

Figure 7A:
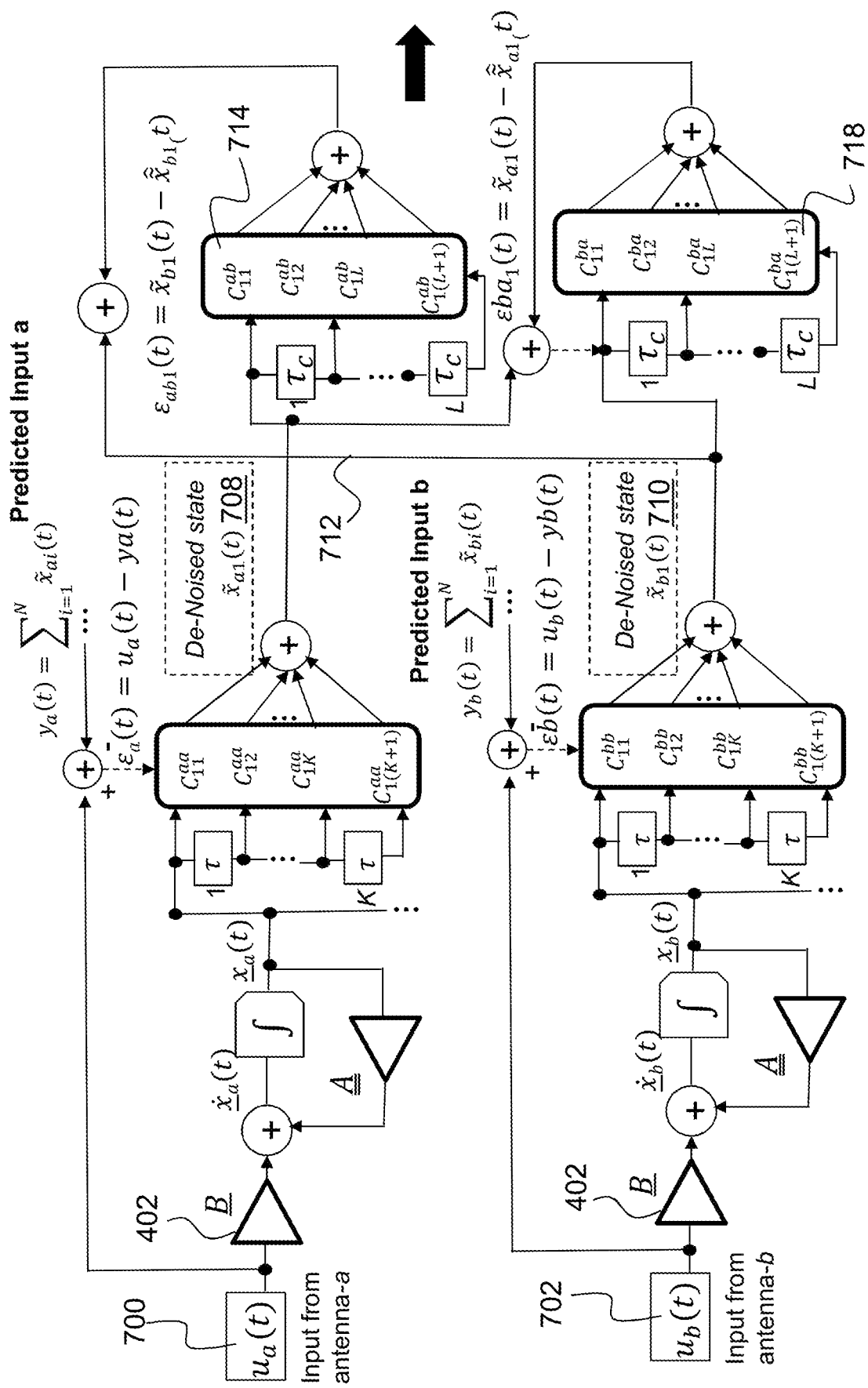
FIG. 7A is an illustration of a first part of an architecture of a multi-input CSP according to some embodiments of the present disclosure.
Figure 7B:
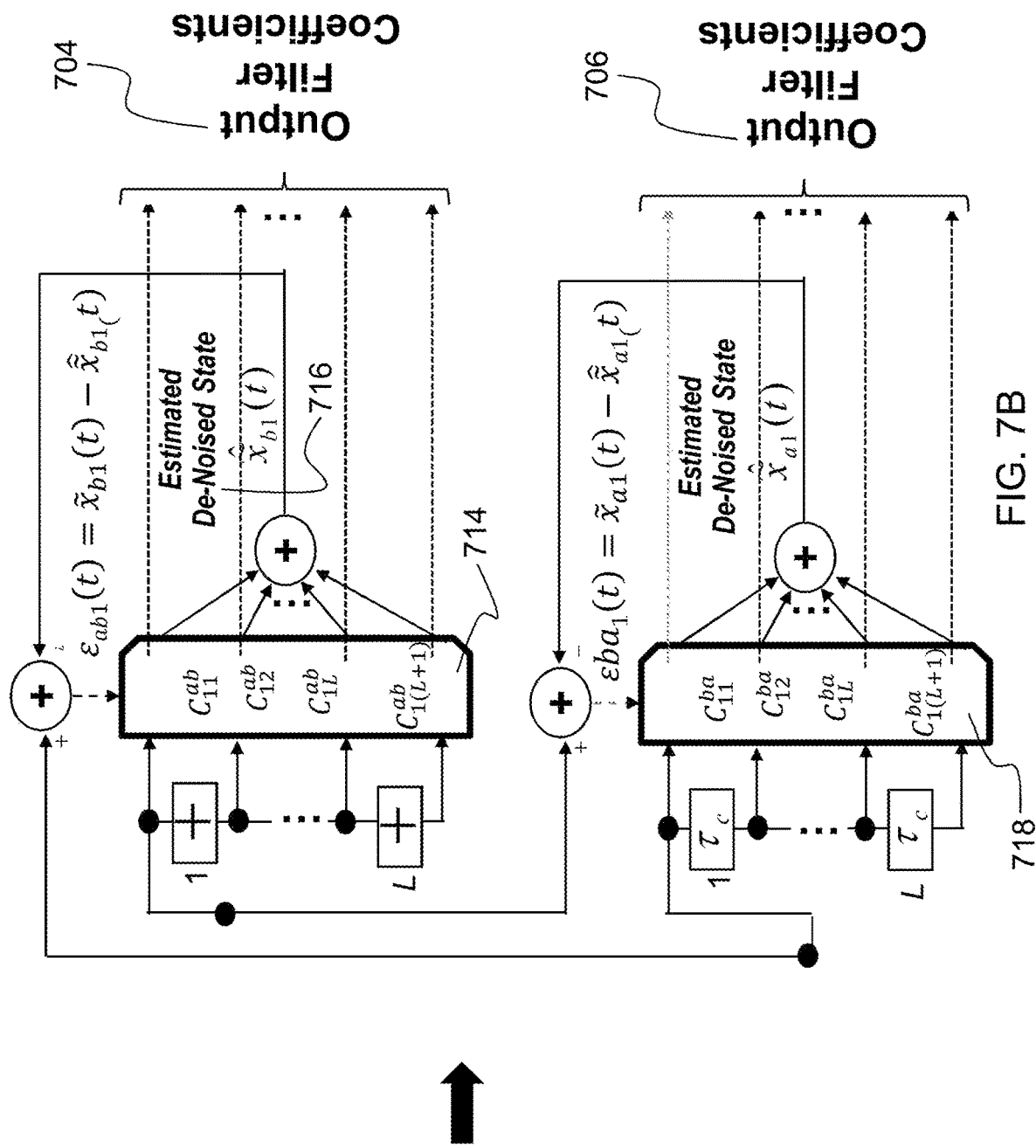
FIG. 7B is an illustration of a second part of the architecture of the multi-input CSP according to some embodiments of the present disclosure.

FIGS. 7A and 7B depict the architecture of the multi-input CSP according to embodiments of the present disclosure that take noisy inputs from multiple antennas 700 and 702 and simultaneously estimates state vectors for each antenna input (elements 700 and 702) that have been de-noised by temporal and spatial prediction, as well as filter coefficients 704 and 706 used to perform the spatial cross-prediction from which the TDOA values and consequently pulse angles of arrival can be calculated. For ease of exposition, FIGS. 7A and 7B show the case for two antennas, but one with ordinary skill in the art can generalize this architecture to more than two antennas. For example, for the case of four inputs (e.g., a, b, c, d), filter coefficients $C^{ab}$ and $C^{ba}$ (elements 714 and 718) could be replaced with twelve filter coefficients $C^{ab}$, $C^{ba}$, $C^{ac}$ and $C^{da}$, and so on.

Antenna a captures a noisy input signal $u_a$ (t) (element 700) and feeds it into a single-input CSP with a length-K delay embedding that outputs a set of N temporally de-noised states $\tilde{x}_{a1}$ (t), ..., $\tilde{x}_{aN}$ (t) (element 708). The system according to embodiments of the present disclosure then takes the de-noised state vectors $\underline{\tilde{x}}_a(t)$ and $\underline{\tilde{x}}_b(t)$ (elements 708 and 710) for each pair (or more) of antennas a and b (elements 700 and 702) and uses each state vector to perform spatial cross-prediction of the other (element 712). More specifically, in order for $\underline{\tilde{x}}_a(t)$ (element 708) to cross-predict $\underline{\tilde{x}}_b(t)$ (element 712) each element $\tilde{x}_{an}$ (t) of the de-noised state vector $\underline{\tilde{x}}_a(t)$ (element 708) is sent into a length-L delay embedding and then combined in a weighted sum with filter coefficients $C_{n1}{}^{ab}, \ldots C_{n(L+1)}{}^{ab}$ (element 714) to obtain the spatially de-noised state vector $\tilde{\tilde{x}}_{bn}$ (t) (element 716). The filter coefficients $C_{n1}{}^{ab}, \ldots C_{n(L+1)}{}^{ab}$ (element 714) are adapted via gradient descent using the cross-prediction error function $\varepsilon_{abn}(t)=\tilde{x}_{bn}(t)-\tilde{\tilde{x}}_{bn}(t)$.

To estimate the TDOA (time-difference of arrival) $\tau_{ab}$ between the pulse arriving at antenna a and b, the invention described herein compares the output filter coefficients $C_{n1}{}^{ab}, \ldots C_{n(L1)}{}^{ab}$ (element 714) with $C_{n1}{}^{ba}, \ldots C_{n(L+1)}{}^{ba}$ (element 718) for all states $1 \leq n \leq N$.

If a given pulse arrives first at antenna a, then a delayed version of the output at antenna a will effectively predict the output at antenna b, and thus the l-th filter coefficient $C_{nl}{}^{ab}$ that corresponds to that delay value will have the largest amplitude. Since the pulse arrives at antenna b after antenna a, output at antenna b cannot effectively predict the output at antenna a, and thus none of the coefficients $C_{n1}{}^{ba}, \ldots C_{n(L+1)}{}^{ba}$ (element 718) will be significantly larger than any other. Thus, to estimate $\tau_{ab}$, one sets a relative threshold T, and all filter coefficients $C_{nl}{}^{ba}>T$ correspond to a positive delay $\tau_{ab}=l$, and all filter coefficients $C_{nl}{}^{ba}>T$ correspond to a negative delay $\tau_{ab}=-l$, and $\tau_{ab}=l(\tau_c)$. For each pulse delay $\tau_{ab}$ the angle of arrival of the pulse $\theta_{ab}$ relative to antenna a is calculated as $$\theta_{ab} = \sin^{-1}\frac{c\tau_{ab}}{d},$$

where d is the distance between antennas a and b, and c is the speed of light. For a system with more than two antennas, an angle of arrival can be estimated for each pair of antennas. These angles can be aggregated into a single more robust estimate by normalizing the angle relative to one fixed antenna and then calculating an average or median of the normalized angles.

(3.5) Experimental Studies

In this section, the performance of the multi-input CSP described herein for TDOA estimation is compared to the Least Means-Square (LMS) approach of Emadzadeh at al. (see Literature Reference No. 1) that performs TDOA estimation directly using the noisy input signals. All of the following results were demonstrated in a software simulation of the scenario in FIG. 8.

In a simulated scenario, the signal environment consists of 5 RF linear up-chirp pulses, each with chirp rate $7.8782 \times 10^{-5}$ (fs)$^{-2}$ (femtoseconds). The simulation bandwidth is 166 MHz and each chirp pulse has a signal bandwidth of 60 Mhz. The RF chirps are combined with additive Gaussian noise so that the SNR for the signal environment is 10 decibels (dB). FIG. 8 depicts the geometry of a simulated test scenario. As depicted in FIG. 8, for this scenario, two input signals were generated from two antennas 800 and 802 that are 100 meters apart. The five chirp pulses (elements 804, 806, 808, 810, and 812) each arrive at the two antennas from a different direction, and the directions of the five chirps from the perpendicular direction to the line connecting the two antennas are 40°, −85°, 6°, 22°, and −30°, respectively.

Figure 9A:
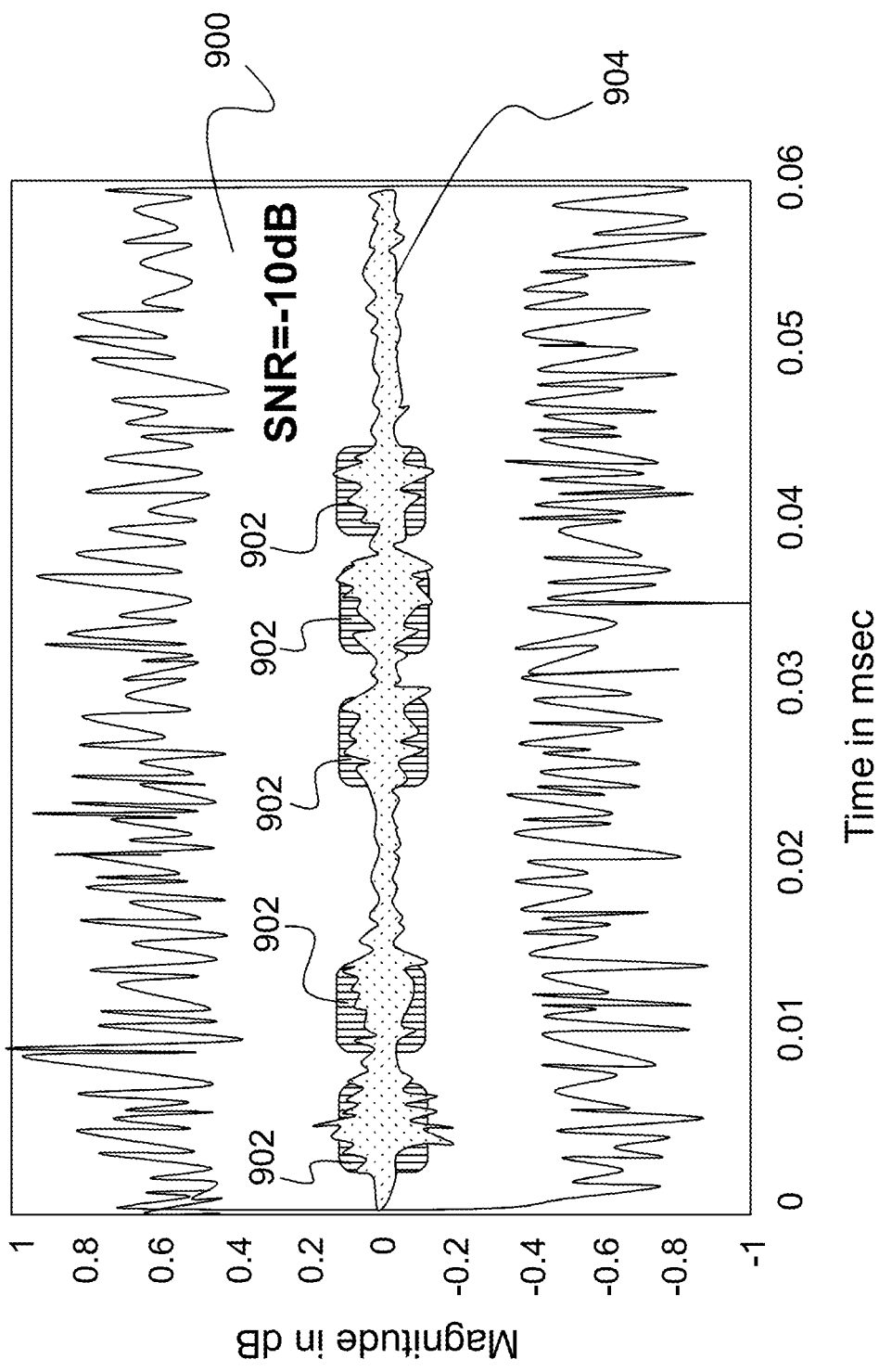
FIG. 9A is an illustration of de-noising performance for a time domain input for a signal received from a first antenna according to some embodiments of the present disclosure.
Figure 9B:
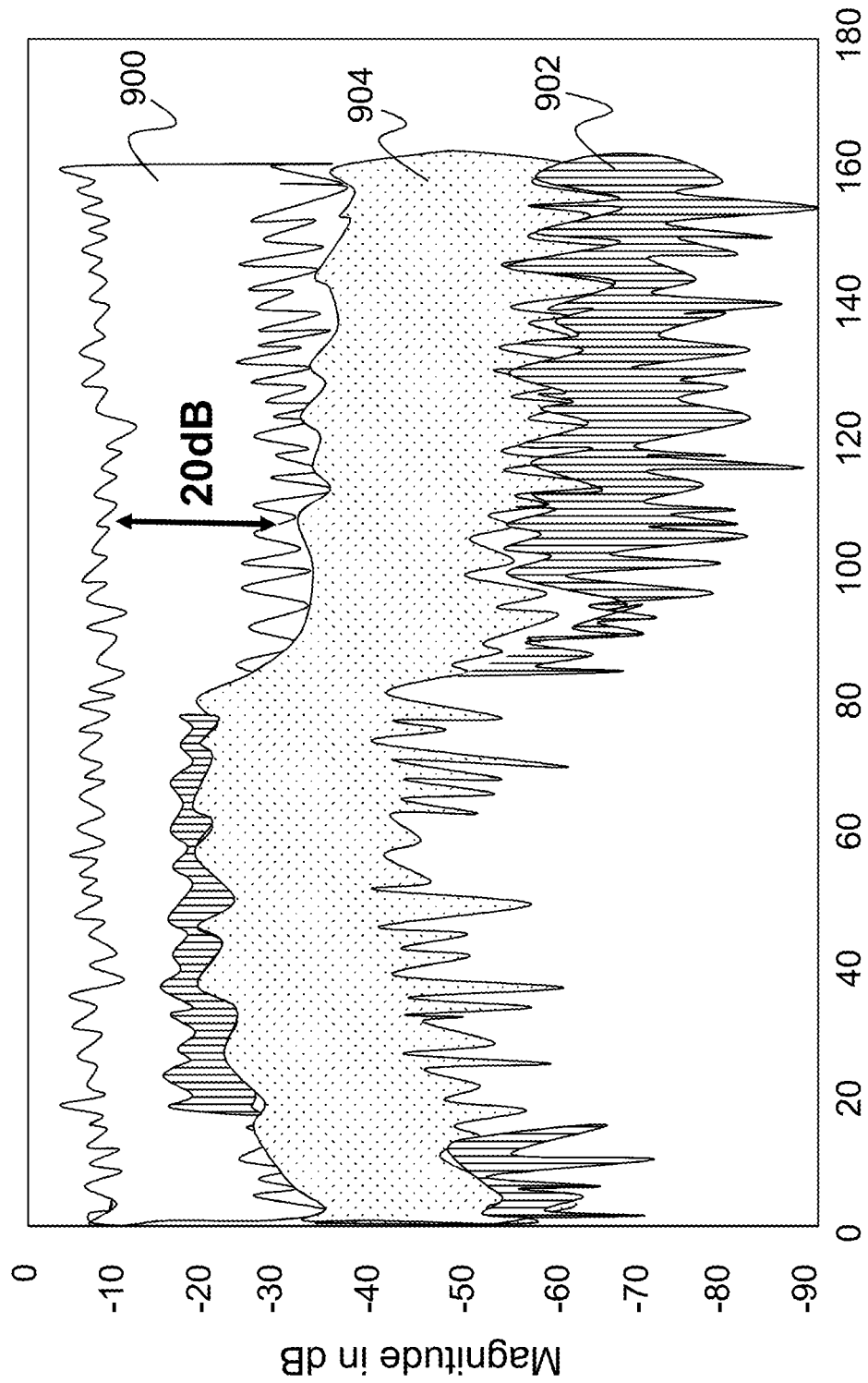
FIG. 9B is an illustration of de-noising performance for a fast Fourier transform (FFT) for a signal received from the first antenna according to some embodiments of the present disclosure.
Figure 9C:
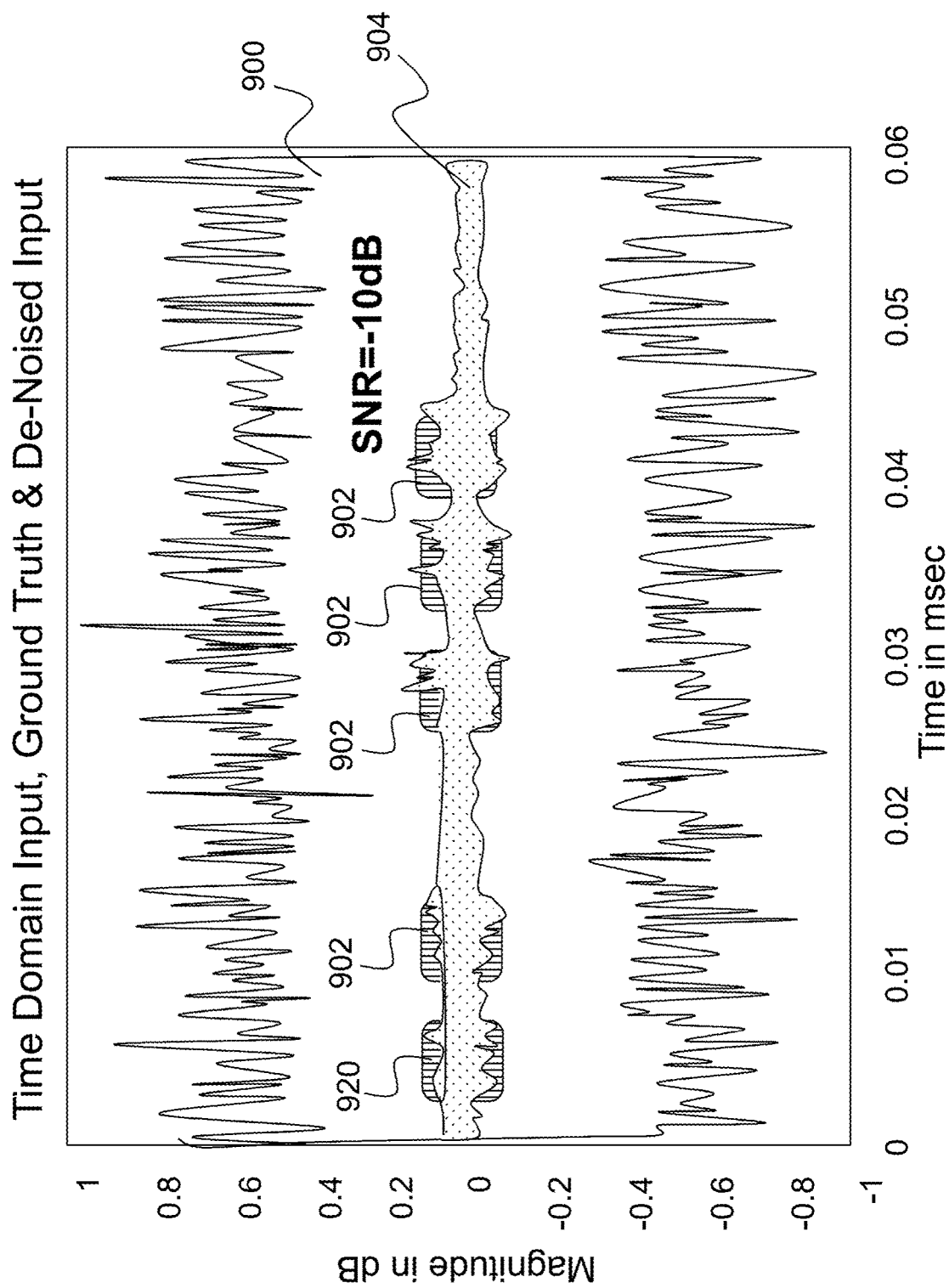
FIG. 9C is an illustration of de-noising performance for a time domain input for a signal received from a second antenna according to some embodiments of the present disclosure.
Figure 9D:
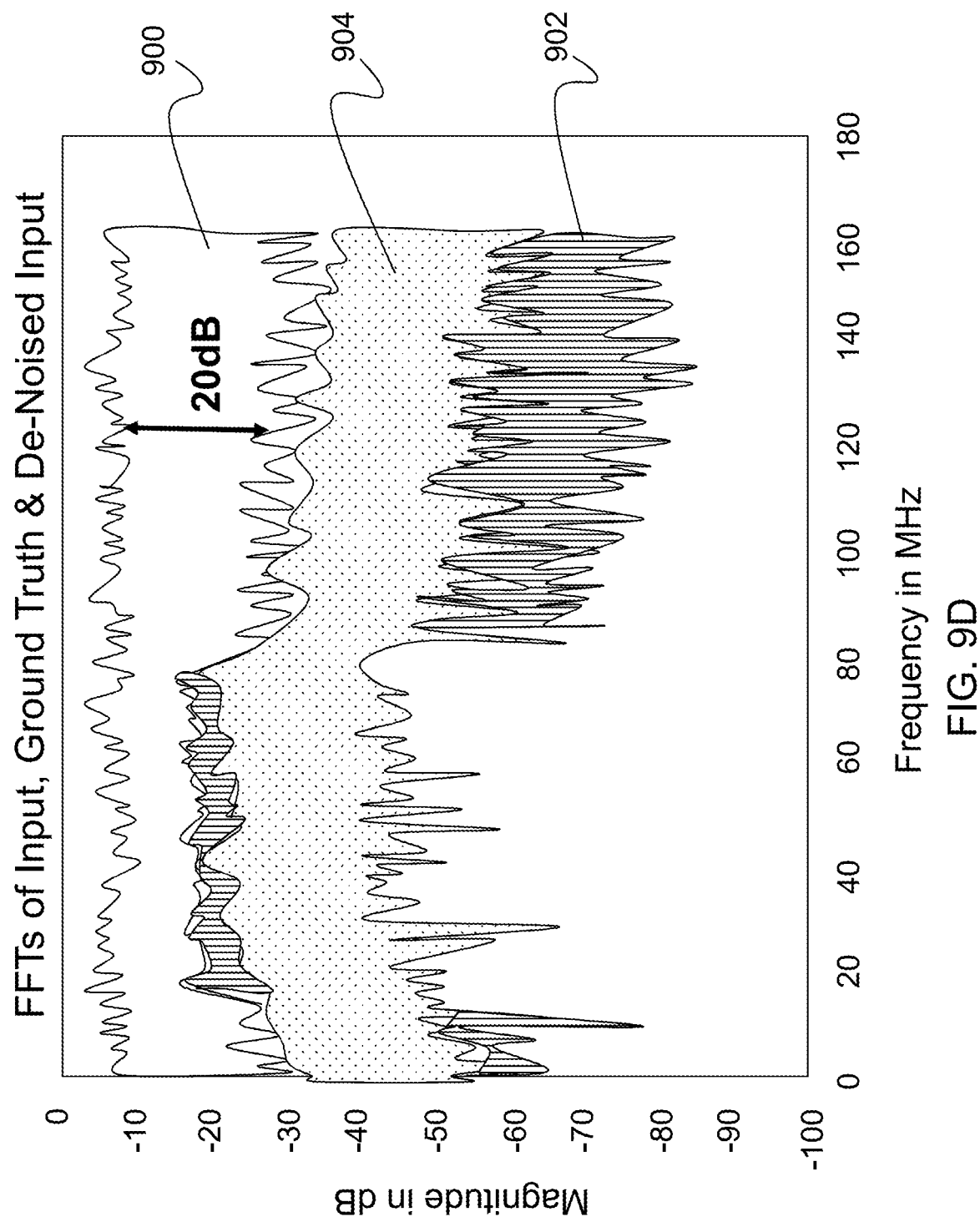
FIG. 9D is an illustration of de-noising performance for a fast Fourier transform (FFT) for a signal received from the second antenna according to some embodiments of the present disclosure.

FIGS. 9A-9D show the denoising performance of the CSP according to embodiments of the present disclosure of signals received from two antennae each receiving chirp pulses from five sources in a −10 dB SNR environment. FIG. 9A is a plot depicting a signal at a first antenna, and FIG. 9B is a plot of the fast Fourier transform (FFT) of that signal. FIG. 9C is a plot depicting a signal at a second antenna, and FIG. 9D is a plot of the FFT of that signal. FIGS. 9A and 9C plot a time domain input (unfilled area 900), ground truth (striped area 902), and de-noised input (dotted area 904). FIGS. 9B and 9D plot FFTs of the input signal (unfilled area 900), ground truth (striped area 902), and de-noised signal (dotted area 904). By de-noising the time domain input signals depicted in FIGS. 9A and 9C, the chirp pulses can be detected despite the high amount of noise, and the system described herein reduces noise by 20 dB (see FIGS. 9B and 9D).

Figures 10A, 10B:
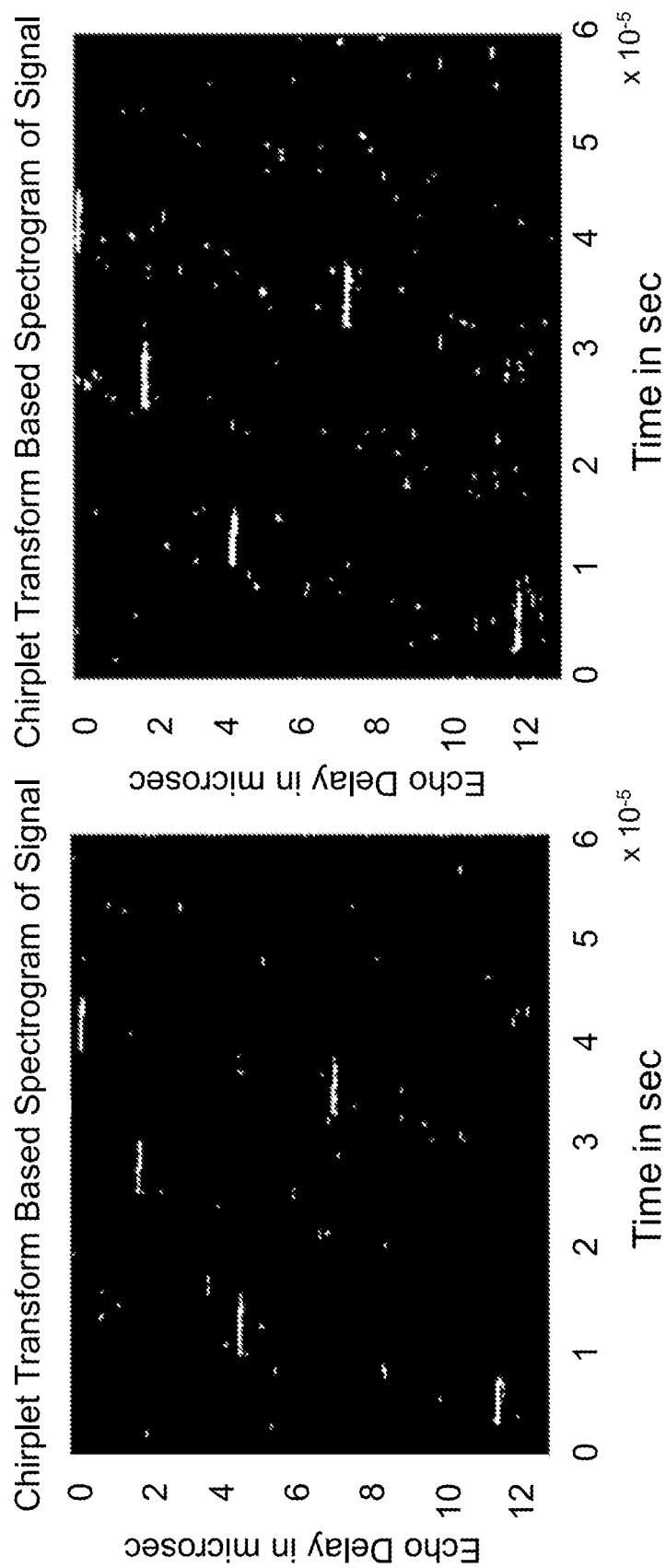
FIG. 10A is an illustration of a real-time chirplet spectrogram of denoised input at the first antenna according to some embodiments of the present disclosure.
FIG. 10B is an illustration of a real-time chirplet spectrogram of denoised input at the second antenna according to some embodiments of the present disclosure.

In this simulation, the system described herein uses time-varying reservoirs for better de-noising of the chirp pulses present in the antenna inputs. As a byproduct of the de-noising process, the time-varying reservoir produces, in real-time, a chirplet spectrogram (see Literature Reference No. 7) that shows the energy present in the de-noised signals as a function of time and frequency. FIGS. 10A and 10B illustrate real-time chirplet spectrograms of de-noised input at each antenna for the simulated scenario with −10 dB SNR. The five chirps are clearly visible/detectable. FIG. 10A depicts a de-noised input at antenna #1, and FIG. 10B depicts a de-noised input at antenna #2. As shown in FIGS. 10A and 10B, despite a −10 dB SNR signal environment, the five chirp pulses are clearly visible and detectable from the de-noised output of each antenna.

Figures 11A, 11B:
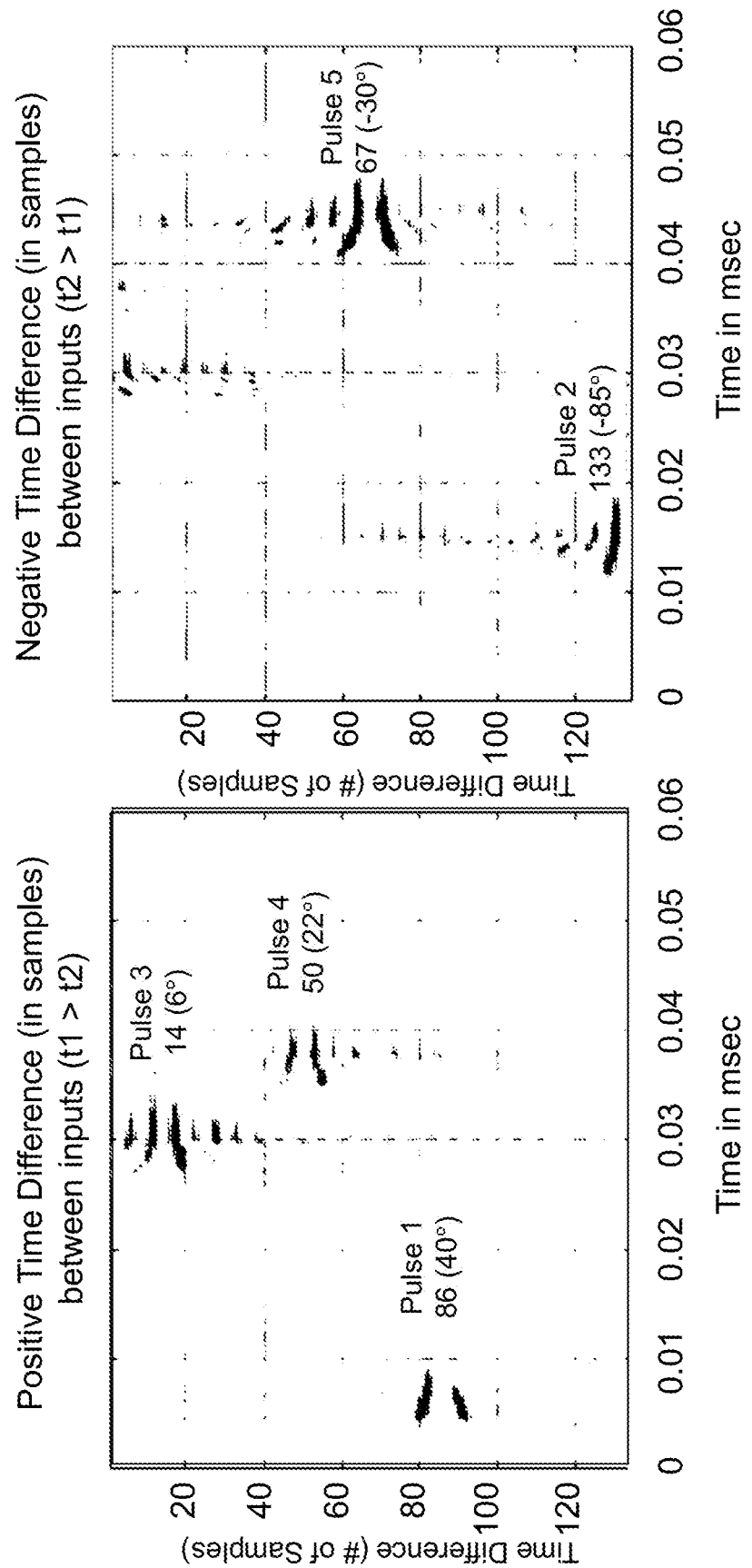
FIG. 11A is an illustration of a time-difference-of-arrival (TDOA) processing map showing prediction of states of the first antenna from delayed values of the states of the second antenna according to some embodiments of the present disclosure.
FIG. 11B is an illustration of a TDOA processing map showing prediction of states of the second antenna from delayed values of the states of the first antenna according to some embodiments of the present disclosure.
Figures 11C, 11D:
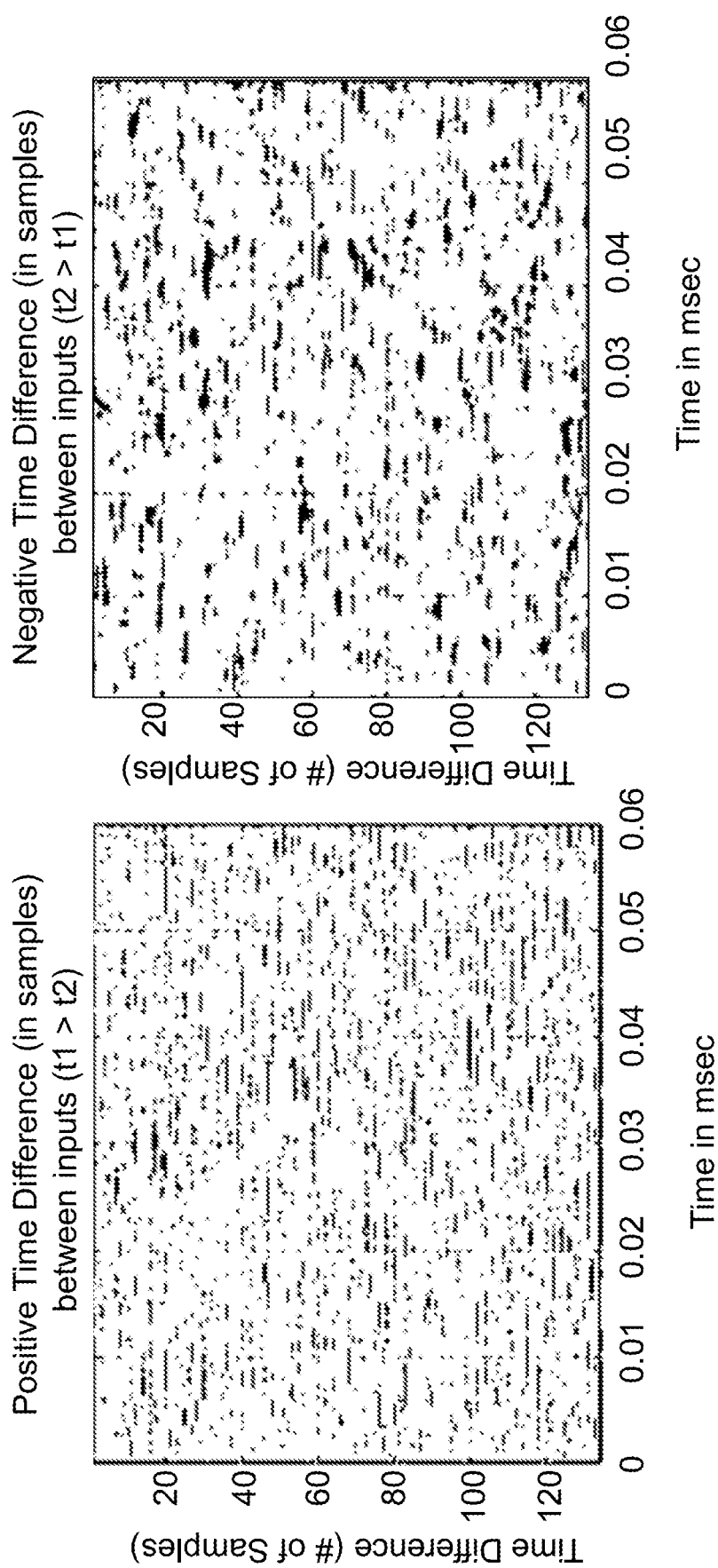
FIG. 11C is an illustration of a TDOA processing map showing prediction of states of the first antenna from delayed values of the states of the second antenna according to prior art.
FIG. 11D is an illustration of a TDOA processing map showing prediction of states of the second antenna from delayed values of the states of the first antenna according to prior art.

The TDOA processing results of the invention described herein were compared to those obtained by using the LMS method of Emadzadeh et al. (see Literature Reference No. 1). FIGS. 11A-11D illustrate amplitudes of FIR filter weights as a function for adaptive prediction. FIGS. 11A and 11C are plots illustrating the amplitude of FIR filter weights as a function of time for adaptively predicting the states of antenna #1 from delayed values of the states of antenna #2 according to the invention described herein. The time difference in samples directly corresponds to positive angles. Similarly, in FIGS. 11B and 11D, the plots are of the amplitude of FIR filter weights as a function of time for adaptively predicting the states of antenna #2 from delayed values of the states of antenna #1 according to prior art (see Literature Reference No. 1). FIGS. 11A and 11B show results using the invention described herein, while FIGS. 11C and 11D show results for the method of Emadzadeh et al. (see Literature Reference No. 1). It is clear that all five pulses are visually discernable in the plots at the correct angles of arrival (FIGS. 11A and 11B), whereas for Emadzadeh et al. (FIGS. 11C and 11D), the weights do not converge to recognizable patterns or delay values.

Figure 12A:
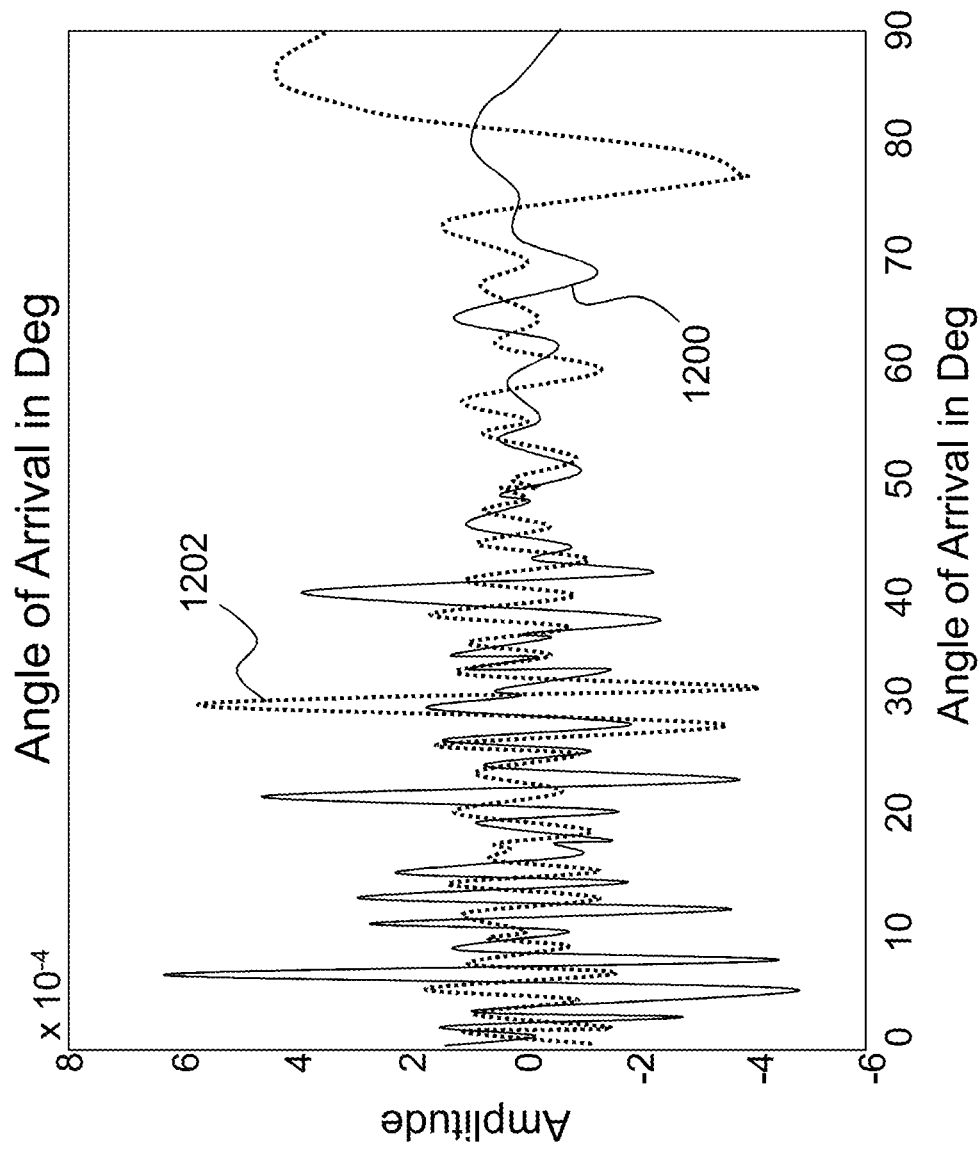
FIG. 12A is an illustration of amplitudes of integrated, transformed, and interpolated finite impulse response (FIR) filters's weights as a function of TDOA angle according to some embodiments of the present disclosure.
Figure 12B:
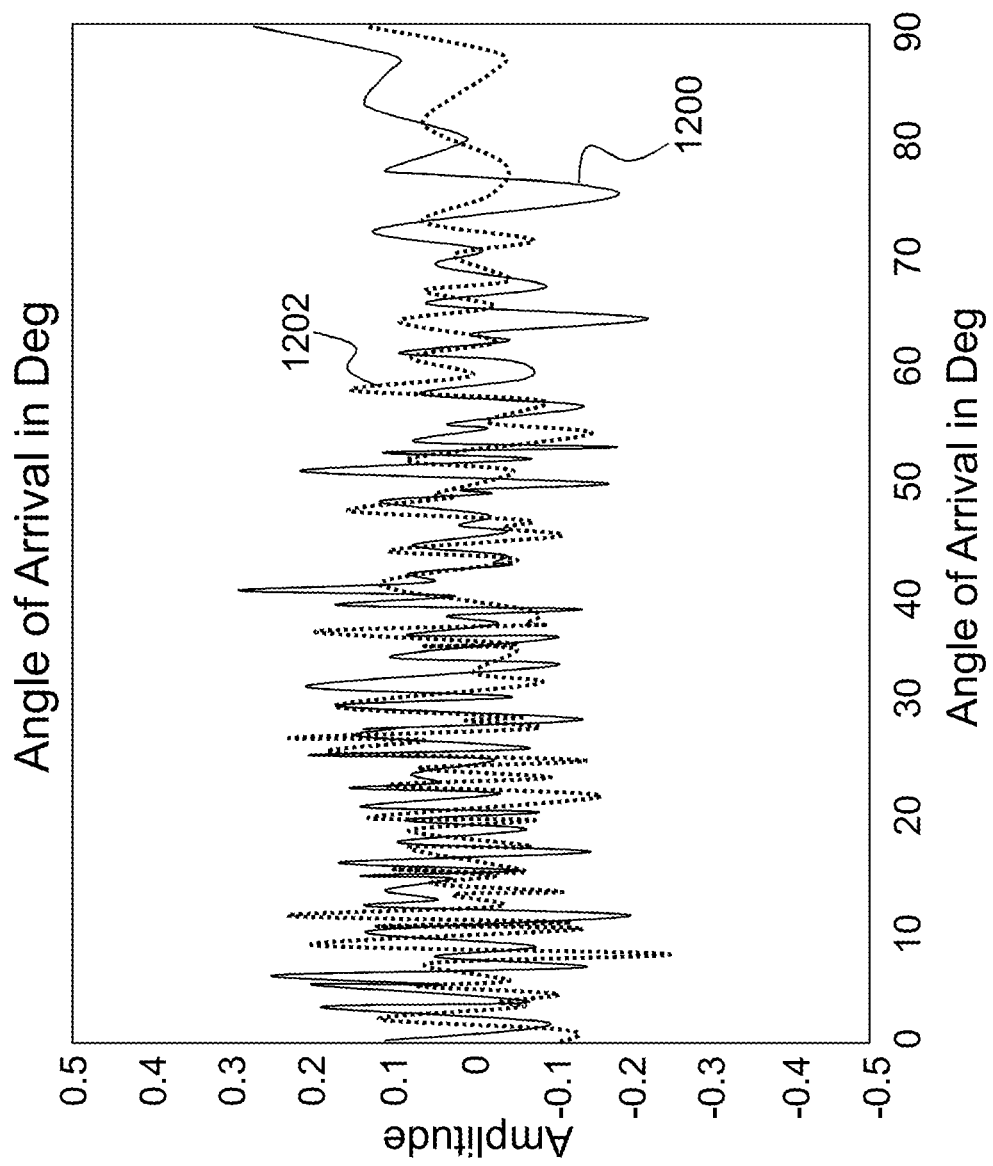
FIG. 12B is an illustration of amplitudes of integrated, transformed, and interpolated FIR filters's weights as a function of TDOA angle according to prior art.

Finally, the automated angle detection performance of the present invention was compared to the method of Emadzadeh et al. (see Literature Reference No. 1) in FIGS. 12A and 12B, respectively, which depict amplitudes of integrated (along each pulse length and bandwidth), transformed, and interpolated FIR filters' weights as a function of the angle derived from TDOA estimation. In each of FIGS. 12A and 12B, the solid curve 1200 corresponds to positive angles, and the dashed curve 1202 corresponds to negative angles. To automatically estimate the angle of arrival of each pulse, the FIR filter weights were integrated over time to obtain these one-dimensional (1-D) curves for each predictive filter response. The peak in these curves directly correspond to TDOA, and consequently angle of arrival values. As shown in FIG. 12A, all five pulses are accurately detected with correct angles using the invention, while in FIG. 12B (prior art), no angle of arrival values can be detected by Emadzadeh et al., because the input SNR is too low.

In summary, the system described herein simultaneously predicts, de-noises, and provides time, frequency, and direction information about the signals captured from two or more antenna inputs in real-time and with little or no latency. The invention exhibits multiple advantages in challenging denoising scenarios relative to current state-of-the-art methods. First, the multi-input CSP performs adaptive filtering, and its hardware-based embodiment requires much less weight and power than current brute-force channelization methods. Second, when instantiated in custom CMOS hardware, the multi-input CSP can cover an ultra-wide bandwidth of over 30 GHz and yet still exhibit very low latencies on the order of 0.1 nanoseconds. Third, the invention described herein is capable of denoising signals in real-time using the constraint that the waveforms of interest in a source signal can be linearly predicted over a short interval of time, which can be computed quickly with limited computational cost, and covers a wide range of electromagnetic and acoustic signals of interest.

Many other current approaches use powerful, but computationally expensive constraints, such as signal complexity measures, or rely on loose constraints, such as filter banks, which may be less computationally expensive but have limited capacity to capture the structure of real-world source signals. Previous approaches are only able to perform temporal signal prediction and are not able to estimate of the angle of arrival of signal pulses. By performing spatial cross-prediction as well as temporal short-time prediction, the system according to embodiments of the present disclosure provides enhanced de-noising performance over previous single-input CSPs, while also robustly estimating the angles-of-arrival of multiple signal pulses. Compared with other methods that perform spatial cross-prediction, such as the system described in Literature Reference No. 1, the invention described herein provides simultaneously, and in real-time, information about the temporal, frequency, and direction of incoming pulses, whereas the methods in Literature Reference No. 1 only leverage temporal and directional information. Thus, by also leveraging the frequency information of the signals, the approach according to the present disclosure can tolerate lower SNR environments and can more reliably estimate angles of arrival for multiple incoming signal pulses.

Furthermore, the system according to embodiments of the present disclosure is directly applicable to electronic warfare (EW) systems, particularly Electronic Support Measures (ESM) receivers that can perform real-time processing of signals over an ultra-wide bandwidth. The invention provides expanded situational awareness, providing the core functionality required for ultra-low latency signal detection and analysis over a 30 GHz instantaneous bandwidth to enable real-time resource allocation based on the RF environment. This performance can be achieved on computing platforms with orders of magnitude lower size, weight, and power. The multi-input CSP used by this invention provides enhanced situational awareness that enables the detection and separation of emitter pulses by direction in addition to time and frequency.

In addition, the multi-input cognitive signal processor described herein is applicable to vehicle applications, enabling multi-static radar in low SNR conditions. By making use of inputs from multiple antennas, the system can better detect, track, and classify vehicles and obstacles in the driving environment.

The additional capability of the CSP according to embodiments of the present disclosure to generate a real-time 3-D spectrogram with information about time, frequency, and now direction further facilitates situational awareness for airborne platforms and autonomous vehicles (e.g., cars) having the CSP within the platform or vehicle.

Moreover, application of estimating an angle of arrival of signal pulses is in the geodesic location or geolocation of mobile communication devices, such as cell phones. Multiple receivers on a base station can use the method described herein to estimate the angle of arrival of the cell phone's signal, and this information would be combined to determine the cell phone's location on the earth.

In addition, angle of arrival is used to discover the location of pirate radio stations or of any military radio transmitter. In submarine acoustics, estimating the angle of arrival can be used to localize the objects with active or passive ranging. The estimated angles of arrival are used to detect directions and/or locations of radio frequency emitting devices. The system described herein can be implemented in any device that uses such information. For example, direction information can help in controlling a radio frequency (RF) jamming device used in electronic warfare.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for estimating time-difference-of-arrival (TDOA) of incoming signals, the system comprising:
   a multi-input cognitive signal processor (CSP) and a non-transitory computer-readable medium having executable instructions encoded thereon such that when executed, the multi-input CSP performs operations of:
   receiving a mixture of input signals from an antenna a and an antenna b;
   predicting and temporally de-noising an input signal a received from antenna a using a first input of the multi-input CSP, resulting in a de-noised state vector for input signal a;
   predicting and temporally de-noising an input signal b received from antenna b using a second input of the multi-input CSP, resulting in a de-noised state vector for input signal b;
   using the de-noised state vectors for one of input signals a and b, cross-predicting and spatially de-noising the other of the de-noised state vectors for input signals a and b; and
   estimating TDOA values of signal pulses to each of antennas a and b.

2. The system as set forth in claim 1, wherein the multi-input CSP further perform an operation of converting the TDOA values into estimated angles of arrival for each signal pulse.

3. The system as set forth in claim 2, wherein the estimated angles of arrival are used to geolocate at least one mobile communication device.

4. The system as set forth in claim 2, wherein the estimated angles of arrival are used to detect at least one of a direction and a location of at least one radio frequency emitting device.

5. The system as set forth in claim 1, where in predicting and temporally de-noising each of input signals a and b, the multi-input CSP further performs operations of:
   linearly mapping one of input signals a and b into a reservoir computer (RC);
   generating a high-dimensional state-space representation of the mixture of input signals from antennas a and b;
   generating a delay embedded state signal from a reservoir state of one of input signals a and b; and
   temporally de-noising the reservoir state, resulting in the de-noised state vector for one of input signals a and b.

6. The system as set forth in claim 1, where in cross-predicting the de-noised state vector for input signal b by the de-noised state vector for input signal a, each element of the de-noised state vector for input signal a is sent into a length-L delay embedding and then combined in a weighted sum with a set of output filter coefficients related to input signal a to obtain a spatially de-noised state vector for input signal b.

7. The system as set forth in claim 6, wherein the set of output filter coefficients related to input signal a is adapted via gradient descent using a cross-prediction error function that is a difference between the de-noised state vector for input signal a and the de-noised state vector for input signal b.

8. The system as set forth in claim 6, where in estimating TDOA values between a pulse arriving antenna a and antenna b, the multi-input CSP further performs an operation of comparing the set of output filter coefficients related to input signal a, $C_{n1}{}^{ab}, \ldots C_{n(L+1)}{}^{ab}$, to a set of output filter coefficients related to input signal b, $C_{n1}{}^{ba}, \ldots C_{n(L+1)}{}^{ba}$, wherein filter coefficients for antenna a that exceed a predetermined threshold correspond to a positive pulse delay $\tau_{ab}=1$, and filter coefficients for antenna b that exceed the predetermined threshold correspond to a negative pulse delay $\tau_{ab}=-1$, and wherein n denotes a particular state number, l denotes an estimated delay between two antennas, L denotes a maximum delay between the two antennas, and C denotes a set of output filter coefficients.

9. The system as set forth in claim 8, wherein for each pulse delay $\tau_{ab}$, an angle of arrival $\theta_{ab}$ for the signal pulse relative to antenna a is calculated as $$\theta_{ab} = \sin^{-1}\frac{c\tau_{ab}}{d},$$

where a denotes a distance between antenna a and antenna b, and c is the speed of light.

10. A computer implemented method for estimating time-difference-of-arrival (TDOA) of incoming signals, the method comprising an act of:
  causing a multi-input cognitive signal processor (CSP) to execute instructions encoded on a non-transitory computer-readable medium, such that upon execution, the multi-input CSP performs operations of:
    receiving a mixture of input signals from an antenna a and an antenna b;
    predicting and temporally de-noising an input signal a received from antenna a using a first input of the multi-input CSP, resulting in a de-noised state vector for input signal a;
    predicting and temporally de-noising an input signal b received from antenna b using a second input of the multi-input CSP, resulting in a de-noised state vector for input signal b;
    using the de-noised state vectors for one of input signals a and b, cross-predicting and spatially de-noising the other of the de-noised state vectors for input signals a and b; and
    estimating TDOA values of signal pulses to each of antennas a and b.

11. The method as set forth in claim 10, wherein the multi-input CSP further performs an operation of converting the TDOA values into estimated angles of arrival for each signal pulse.

12. The method as set forth in claim 10, where in predicting and temporally de-noising each of input signals a and b, the multi-input CSP further performs operations of:
  linearly mapping one of input signals a and b into a reservoir computer (RC);
  generating a high-dimensional state-space representation of the mixture of input signals from antennas a and b;
  generating a delay embedded state signal from a reservoir state of one of input signals a and b; and
  temporally de-noising the reservoir state, resulting in the de-noised state vector for one of input signals a and b.

13. The method as set forth in claim 10, where in cross-predicting the de-noised state vector for input signal b by the de-noised state vector for input signal a, each element of the de-noised state vector for input signal a is sent into a length-L delay embedding and then combined in a weighted sum with a set of output filter coefficients related to input signal a to obtain a spatially de-noised state vector for input signal b.

14. The method as set forth in claim 13, wherein the set of output filter coefficients related to input signal a is adapted via gradient descent using a cross-prediction error function that is a difference between the de-noised state vector for input signal a and the de-noised state vector for input signal b.

15. The method as set forth in claim 13, where in estimating TDOA values between a pulse arriving antenna a and antenna b, the multi-input CSP further performs an operation of comparing the set of output filter coefficients related to input signal a, $C_{n1}{}^{ab}, \ldots C_{n(L+1)}{}^{ab}$ to a set of output filter coefficients related to input signal b, $C_{n1}{}^{ba}, \ldots C_{n(L+1)}{}^{ba}$, wherein filter coefficients for antenna a that exceed a predetermined threshold correspond to a positive pulse delay $\tau_{ab}=1$, and filter coefficients for antenna b that exceed the predetermined threshold correspond to a negative pulse delay $\tau_{ab}=-1$, and wherein n denotes a particular state number, l denotes an estimated delay between two antennas, L denotes a maximum delay between the two antennas, and C denotes a set of output filter coefficients.

16. The method as set forth in claim 15, wherein for each pulse delay $\tau_{ab}$, an angle of arrival $\theta_{ab}$ for the signal pulse relative to antenna a is calculated as $$\theta_{ab} = \sin^{-1}\frac{c\tau_{ab}}{d},$$

where d denotes a distance between antenna a and antenna b, and c is the speed of light.

17. A computer program product for estimating time-difference-of-arrival (TDOA) of incoming signals, the computer program product comprising:
  computer-readable instructions stored on a non-transitory computer-readable medium that are executable by a computer having a multi-input cognitive signal processor (CSP) for causing the multi-input CSP to perform operations of:
    receiving a mixture of input signals from an antenna a and an antenna b;
    predicting and temporally de-noising an input signal a received from antenna a using a first input of the multi-input CSP, resulting in a de-noised state vector for input signal a;
    predicting and temporally de-noising an input signal b received from antenna b using a second input of the multi-input CSP, resulting in a de-noised state vector for input signal b;
    using the de-noised state vectors for one of input signals a and b, cross-predicting and spatially de-noising the other of the de-noised state vectors for input signals a and b; and
    estimating time-difference-of-arrival (TDOA) values of signal pulses to each of antennas a and b.

18. The computer program product as set forth in claim 17, wherein the multi-input CSP further performs an operation of converting the TDOA values into estimated angles of arrival for each signal pulse.

19. The computer program product as set forth in claim 17, where in predicting and temporally de-noising each of input signals a and b, the multi-input CSP further performs operations of:

linearly mapping one of input signals a and b into a reservoir computer (RC);

generating a high-dimensional state-space representation of the mixture of input signals from antennas a and b;

generating a delay embedded state signal from a reservoir state of one of input signals a and b; and temporally de-noising the reservoir state, resulting in the de-noised state vector for one of input signals a and b.

20. The computer program product as set forth in claim 17, where in cross-predicting the de-noised state vector for input signal b by the de-noised state vector for input signal a, each element of the de-noised state vector for input signal a is sent into a length-L delay embedding and then combined in a weighted sum with a set of output filter coefficients related to input signal a to obtain a spatially de-noised state vector for input signal b.

21. The computer program product as set forth in claim 20, wherein the set of output filter coefficients related to input signal a is adapted via gradient descent using a cross-prediction error function that is a difference between the de-noised state vector for input signal a and the de-noised state vector for input signal b.

22. The computer program product as set forth in claim 20, where in estimating TDOA values between a pulse arriving antenna a and antenna b, the multi-input CSP further performs an operation of comparing the set of output filter coefficients related to input signal a, $C_{n1}^{ab}, \ldots C_{n(L+1)}^{ab}$ to a set of output filter coefficients related to input signal b, $C_{n1}^{ba}, \ldots C_{n(L+1)}^{ba}$, wherein filter coefficients for antenna a that exceed a predetermined threshold correspond to a positive pulse delay $\tau_{ab}=1$, and filter coefficients for antenna b that exceed the predetermined threshold correspond to a negative pulse delay $\tau_{ab}=-1$, and wherein n denotes a particular state number, l denotes an estimated delay between two antennas, L denotes a maximum delay between the two antennas, and C denotes a set of output filter coefficients.

23. The computer program product as set forth in claim 22, wherein for each pulse delay $\tau_{ab}$, an angle of arrival $\theta_{ab}$ for the signal pulse relative to antenna a is calculated as $$\theta_{ab} = \sin^{-1}\frac{c\tau_{ab}}{d},$$

where a denotes a distance between antenna a and antenna b, and c is the speed of light.

* * * * *